United States Patent
Shaffer et al.

(10) Patent No.: US 9,210,045 B2
(45) Date of Patent: Dec. 8, 2015

(54) GRAVITATIONAL PARENT SELECTION IN DIRECTED ACYCLIC GRAPHS

(75) Inventors: Shmuel Shaffer, Palo Alto, CA (US);
Jean-Philippe Vasseur, Saint Martin d'Uriage (FR); Sandeep Jay Shetty, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 417 days.

(21) Appl. No.: 13/043,176

(22) Filed: Mar. 8, 2011

(65) Prior Publication Data

US 2012/0230222 A1 Sep. 13, 2012

(51) Int. Cl.
*H04L 12/24* (2006.01)
*H04L 12/753* (2013.01)
*H04W 40/24* (2009.01)
*H04W 84/18* (2009.01)

(52) U.S. Cl.
CPC ........... *H04L 41/12* (2013.01); *H04L 45/48* (2013.01); *H04W 40/248* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 5,606,669 A * | 2/1997 | Bertin et al. | 370/256 |
| 6,970,449 B1 | 11/2005 | Smith et al. | |
| 7,095,739 B2 | 8/2006 | Mamillapalli et al. | |
| 7,200,654 B2 * | 4/2007 | Koh et al. | 709/223 |
| 7,362,776 B2 | 4/2008 | Meier et al. | |
| 7,379,433 B1 | 5/2008 | Patel et al. | |
| 7,379,435 B1 | 5/2008 | Kinder | |
| 7,385,977 B2 | 6/2008 | Wu et al. | |
| 7,421,578 B1 | 9/2008 | Huang et al. | |
| 7,423,986 B2 | 9/2008 | Grayson et al. | |
| 7,447,166 B1 | 11/2008 | Kaluve et al. | |
| 7,496,078 B2 | 2/2009 | Rahman | |
| 7,505,450 B2 | 3/2009 | Castagnoli | |
| 7,512,106 B2 | 3/2009 | Van Tran et al. | |
| 7,519,733 B1 | 4/2009 | Thubert et al. | |
| 7,565,169 B1 | 7/2009 | Theobold | |
| 7,567,822 B2 | 7/2009 | Hart et al. | |
| 7,599,367 B2 | 10/2009 | Radhakrishnan et al. | |
| 7,623,474 B2 | 11/2009 | Tran et al. | |
| 7,633,926 B1 | 12/2009 | Sethi et al. | |
| 7,706,345 B2 | 4/2010 | Meier et al. | |
| 7,729,277 B2 | 6/2010 | Jordan et al. | |
| 7,801,137 B2 | 9/2010 | Vasseur et al. | |

(Continued)

OTHER PUBLICATIONS

Thubert, et al., "RPL Objective Function Zero", draft-ietf-roll-of0-05, IETF Internet-Draft, Jan. 2011, 10 pages.

(Continued)

*Primary Examiner* — Timothy J Weidner
(74) *Attorney, Agent, or Firm* — Parker Ibrahim & Berg LLC; James M. Behmke; Stephen D. LeBarron

(57) ABSTRACT

In one embodiment, a particular node in a computer network receives an indication of a number of child nodes of one or more potential parent nodes to the particular node in a primary directed acyclic graph (DAG). From this, the particular node selects a particular potential parent node with the highest number of child nodes as a secondary DAG parent for the particular node, and joins the secondary DAG at the selected secondary DAG parent (e.g., for multicast and/or broadcast message distribution). This may recursively continue, such that nodes gravitate toward parents with more children, potentially allowing parents with fewer children to relinquish their parental responsibilities.

20 Claims, 25 Drawing Sheets

(56) References Cited

U.S. PATENT DOCUMENTS

| | | |
|---|---|---|
| 7,839,843 B2 | 11/2010 | Dontu et al. |
| 7,844,057 B2 | 11/2010 | Meier et al. |
| 7,873,020 B2 | 1/2011 | Hunt et al. |
| 7,899,027 B2 | 3/2011 | Castagnoli et al. |
| 7,911,978 B1 * | 3/2011 | Chandra et al. ............... 370/255 |
| 8,275,313 B1 * | 9/2012 | Myers et al. ................. 455/41.2 |
| 8,589,344 B2 * | 11/2013 | Williamson .................. 707/625 |
| 2006/0020394 A1 * | 1/2006 | Dicke et al. ..................... 702/19 |
| 2007/0066308 A1 * | 3/2007 | Andric et al. ................. 455/445 |
| 2007/0082677 A1 | 4/2007 | Hart et al. |
| 2007/0110024 A1 * | 5/2007 | Meier ........................... 370/351 |
| 2008/0063003 A1 * | 3/2008 | O'Neal ........................ 370/408 |
| 2008/0089248 A1 * | 4/2008 | Ushiyama et al. ............ 370/256 |
| 2008/0148342 A1 | 6/2008 | Aiyagari et al. |
| 2008/0205428 A1 | 8/2008 | Jordan et al. |
| 2008/0212597 A1 * | 9/2008 | Baryshnikov et al. ........ 370/408 |
| 2009/0023418 A1 | 1/2009 | Grevers, Jr. |
| 2009/0135722 A1 | 5/2009 | Boers et al. |
| 2009/0175238 A1 * | 7/2009 | Jetcheva et al. ............... 370/329 |
| 2010/0118736 A1 * | 5/2010 | Chung et al. .................. 370/254 |
| 2011/0267982 A1 * | 11/2011 | Zhang et al. .................. 370/256 |
| 2012/0051295 A1 * | 3/2012 | Ergen ............................ 370/329 |
| 2012/0082065 A1 * | 4/2012 | Yanagihara et al. .......... 370/256 |
| 2012/0110089 A1 * | 5/2012 | Wang et al. ................... 709/205 |
| 2012/0170476 A1 * | 7/2012 | Chen et al. .................... 370/252 |
| 2013/0070646 A1 * | 3/2013 | Myers et al. .................. 370/255 |

OTHER PUBLICATIONS

Vasseur, et al., "Routing Metrics Used for Path Calculation in Low Power and Lossy Networks", draft-ietf-roll-routing-metrics-18, IETF Internet-Draft, Feb. 2011, 31 pages.

Winter, et al., "RPL: IPv6 Routing Protocol for Low Power and Lossy Networks", draft-ietf-roll-rpl-18, IETF Internet-Draft; Jan. 2011, 160 pages.

* cited by examiner

GRAVITATIONAL PARENT SELECTION IN DIRECTED ACYCLIC GRAPHS

TECHNICAL FIELD

The present disclosure relates generally to computer networks, and, more particularly, to directed acyclic graph (DAG) routing and management.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Commonly, wireless sensors utilize mesh networks to communicate with a head-end node (e.g., data collector) and with each other. That is, each sensor (e.g., smart meter) can act as a node in the mesh, where nodes in LLN mesh networks either originate or forward packets over the air. Broadcast messages are commonly used by mesh networks in scenarios such as demand response (DR), software upgrade, etc. When a node receives a broadcast packet it first verifies that this is a new packet (a packet which the node is seeing for the first time). If the packet is found to be a new one, the node retransmits it. However, if the node has already seen this packet, the packet is dropped so as to limit broadcast storm effects. The mass forwarding action by all of the nodes may cause numerous packet collisions resulting in inefficient utilization of the LLN resources. The problem is especially pronounced when node density is high.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
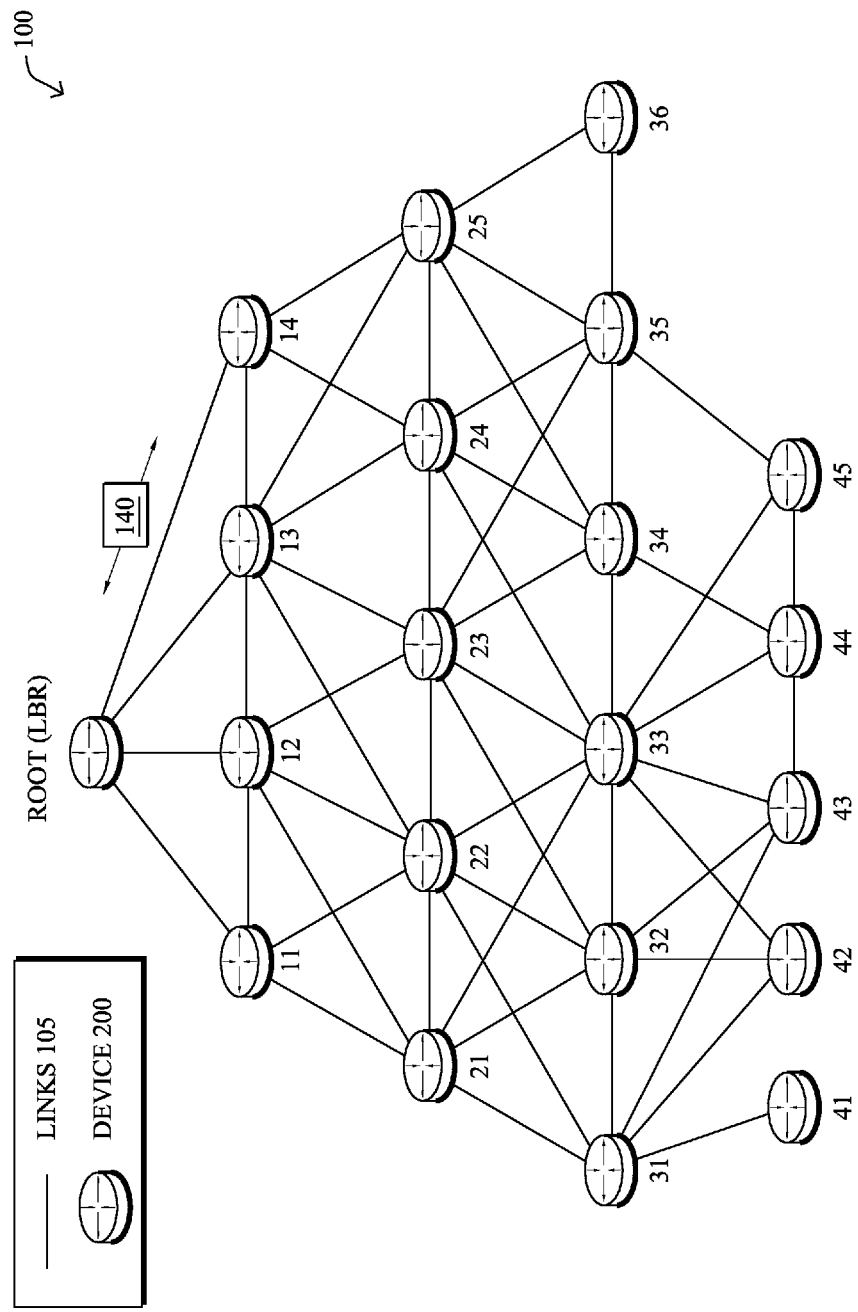
FIG. 1 illustrates an example computer network.

According to one or more embodiments of the disclosure, a particular node in a computer network receives an indication of a number of child nodes of one or more potential parent nodes to the particular node in a primary directed acyclic graph (DAG). From this, the particular node selects a particular potential parent node with the highest number of child nodes as a secondary DAG parent for the particular node, and joins the secondary DAG at the selected secondary DAG parent (e.g., for multicast and/or broadcast message distribution). This may recursively continue, such that nodes gravitate toward parents with more children, potentially allowing parents with fewer children to relinquish their parental responsibilities. In one or more additional embodiments, the particular node is also a parent node, and determines a particular number of child nodes that have joined the secondary DAG at the particular node as their parent, and advertises the particular number of child nodes into the network.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2 and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200 (e.g., labeled as shown, "Root," "11," "12," ... "44," "45," and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) or other shared media protocols where appropriate. In this context, a protocol consists of a set of rules defining how the nodes interact with each other.

Figure 2:
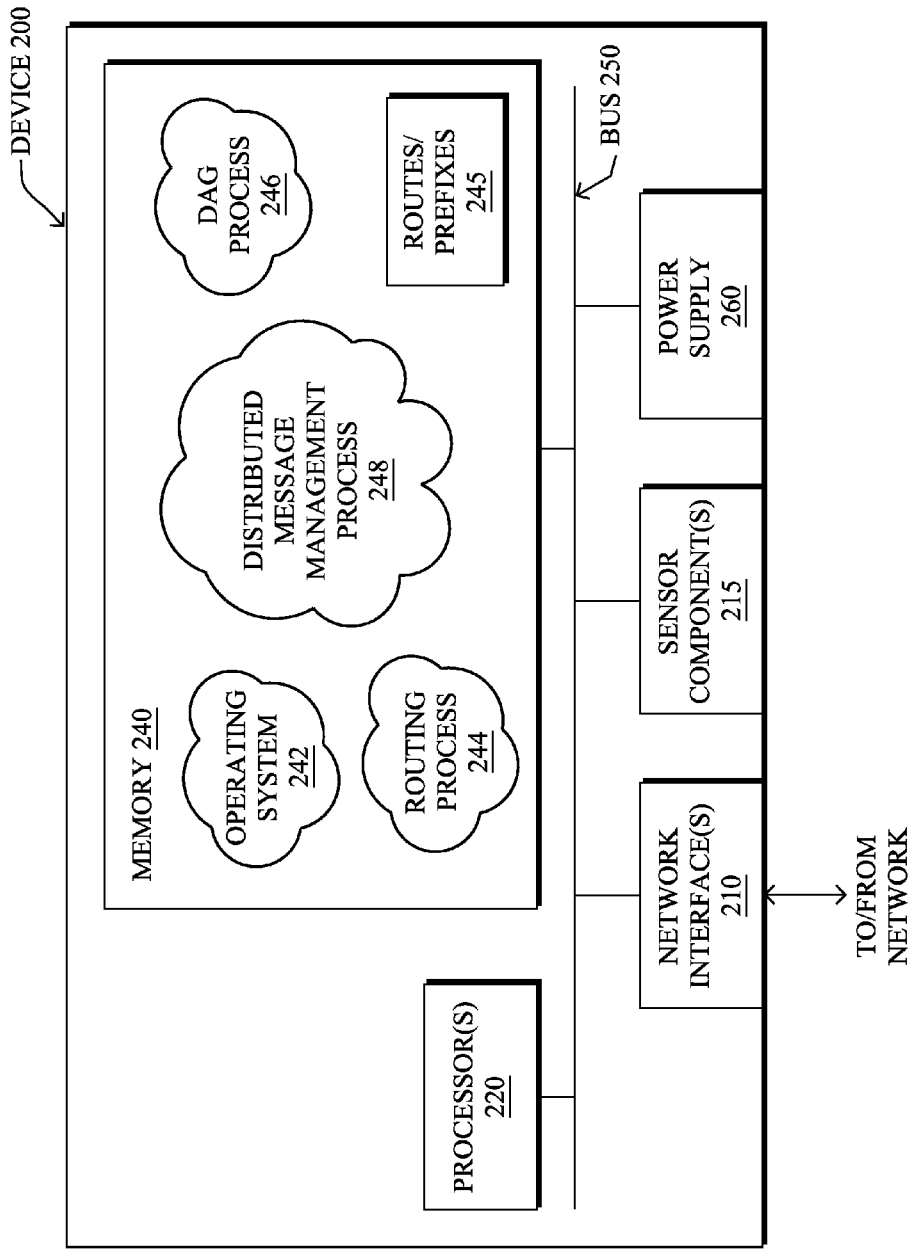
FIG. 2 illustrates an example network device/node.

FIG. 2 is a schematic block diagram of an example node/device 200 that may be used with one or more embodiments described herein, e.g., as nodes 11-45 and ROOT. The device may comprise one or more network interfaces 210 (e.g., wireless), an optional sensor component 215 (e.g., sensors/actuators for sensor network devices), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100 (e.g., wirelessly). The network interfaces may be configured to transmit and/or receive data using a variety of different communication protocols, particularly wireless protocols as noted above and as will be understood by those skilled in the art. Note, further, that the nodes may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, a distributed message management process 248 may also be present in memory 240, for use as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes, such that, e.g., distributed message management process 248 may be part of DAG process 246. Additionally, it will be apparent to those skilled in the art that while the disclosure herein describes the processes as residing in the node 200, some of these processes may operate in servers attached to the network 100 or in a distributed fashion, namely both in the node 200 and in network attached servers.

Routing process (services) 244 contains computer executable instructions which may be executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-18> by Winter, at al. (Feb. 4, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metric-18> by Vasseur, et al. (Feb. 22, 2011 version). Further, an example OF (e.g., a default OF) may be found in an IETF Internet Draft, entitled "RPL Objective Function 0" <draft-ietf-roll-of0-05> by Thubert (Jan. 5, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 3:
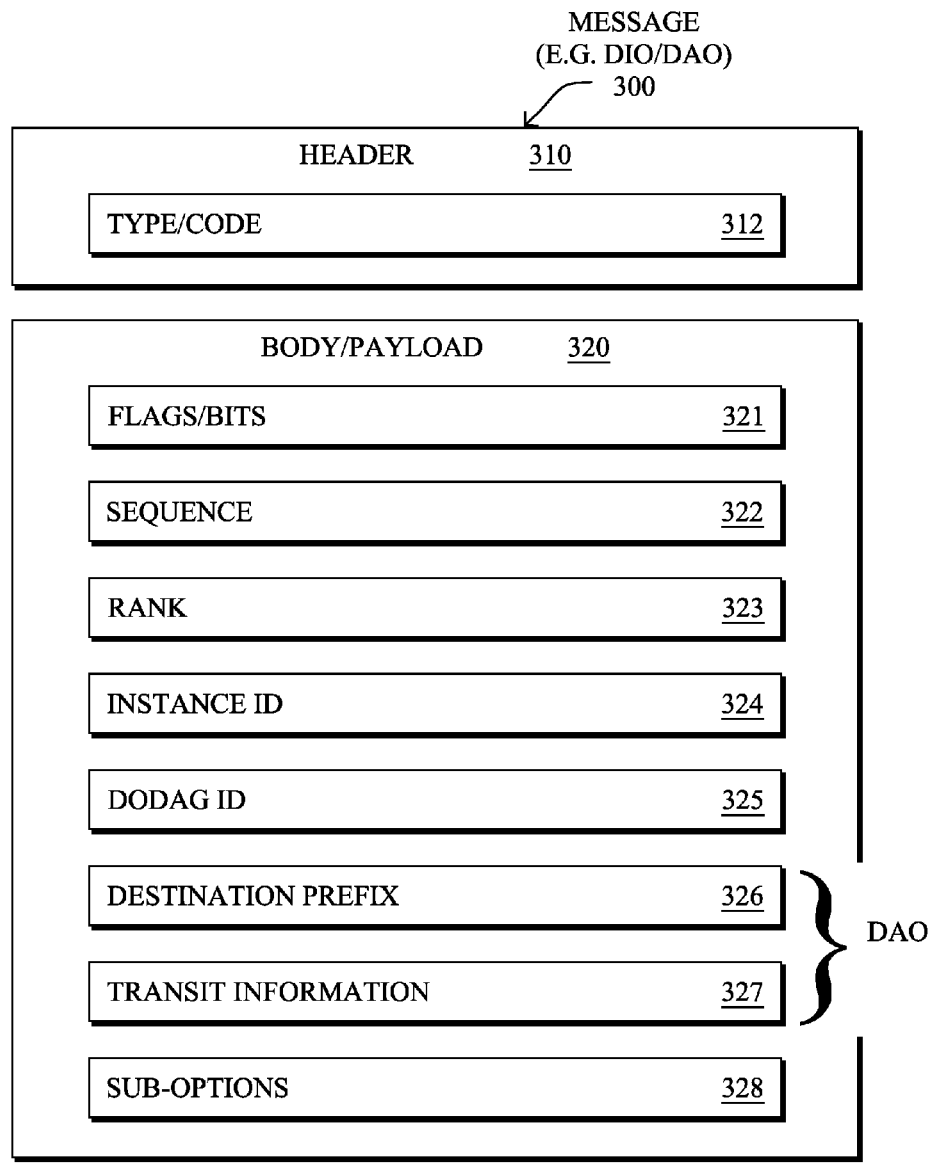
FIG. 3 illustrates an example message.

FIG. 3 illustrates an example simplified control message format 300 that may be used for discovery and route dissemination when building a DAG, e.g., as a DIO or DAO. Message 300 illustratively comprises a header 310 with one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, etc., as may be described herein, e.g., in one or more type-length-value (TLV) fields.

Figure 4:
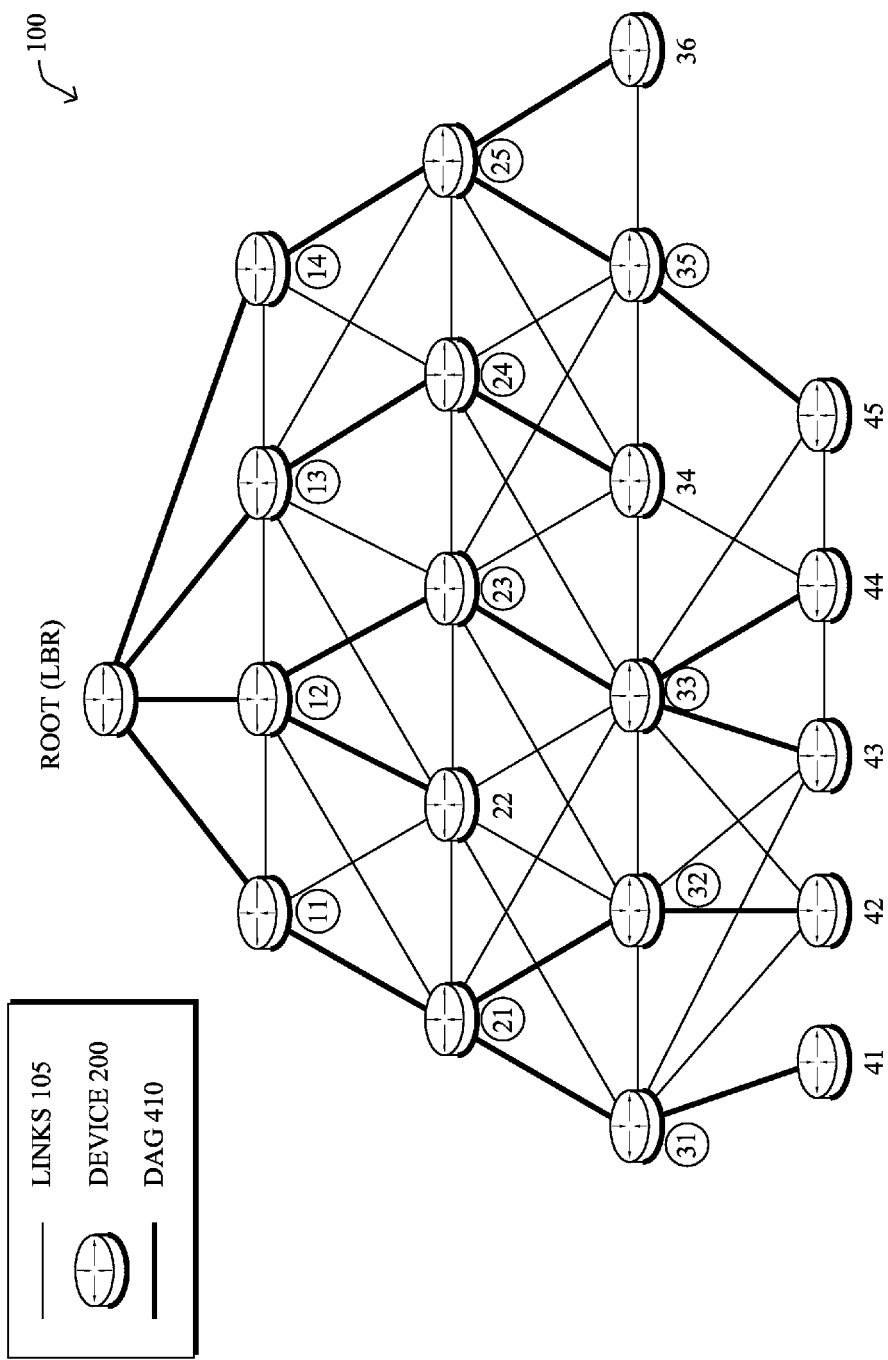
FIG. 4 illustrates an example primary directed acyclic graph (DAG) in the computer network of FIG. 1.

FIG. 4 illustrates an example simplified DAG that may be created, e.g., through the techniques described above (by DAG process 246), within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes.

As noted above, one of the major issue in LLNs, especially on non-synchronized shared media links (e.g., wireless links, etc.) is link congestion: not only is the bandwidth very limited, but it is well-known that the efficiency of data transmission collapses once the offered load exceeds some known limit. Thus congestion may lead to link collapse. Congestion may occur in a number of circumstances, for example, congestion may occur in response to a burst of critical messages after power failure in the grid, the failure of a node or a set of links causing a DAG topology change with a large number of new children joining a node, etc., or even simply in response generally to there being too much traffic in the network.

In particular, broadcast messages are commonly used by mesh networks in scenarios such as demand response (DR), software upgrade, etc. When a node receives a broadcast packet it first verifies that this is a new packet (a packet which the node is seeing for the first time). If the packet is found to be a new one, the node retransmits the packet if it is a parent node (circled node IDs in FIG. 4). However, if the node has already seen this packet, the packet is dropped so as to limit broadcast storm effects. The mass forwarding action by all of the nodes may cause numerous packet collisions resulting in inefficient utilization of the LLN resources. The problem is especially pronounced when node density is high.

Figure 5A:
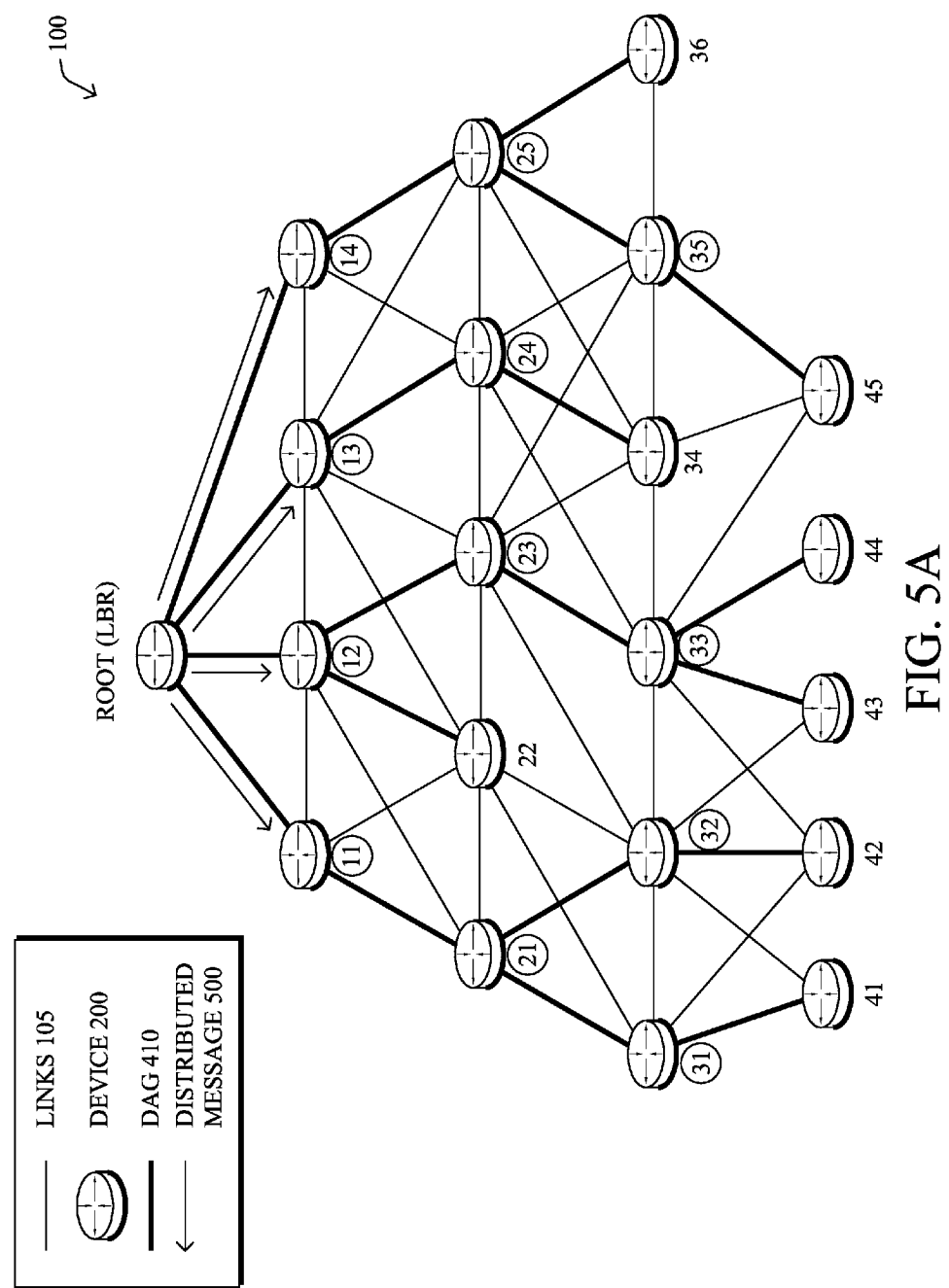
FIGS. 5A-E illustrate an example of a distributed message (e.g., broadcast, multicast, etc.) on the primary DAG in the network of FIG. 4.
Figure 5B:
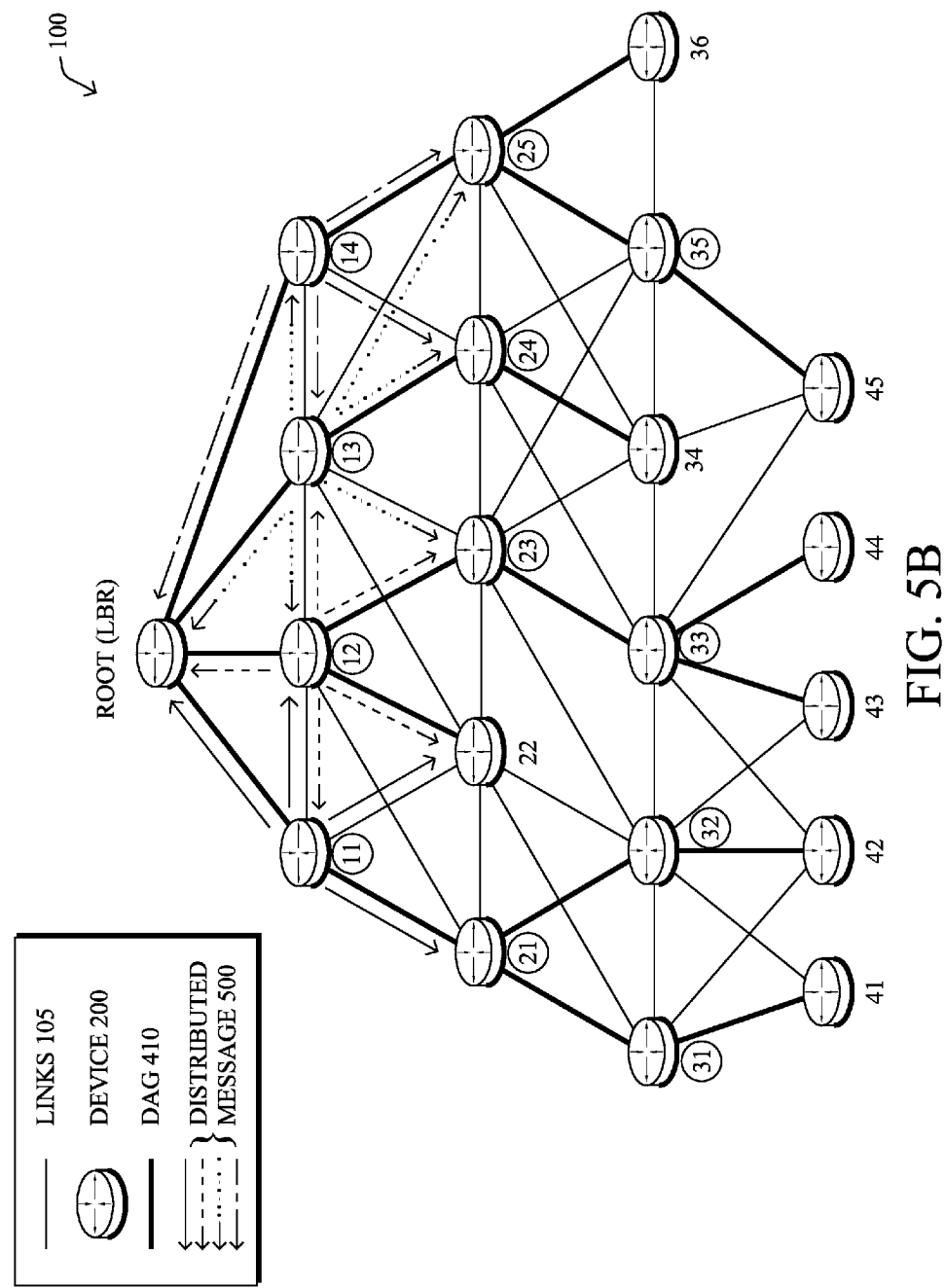

FIGS. 5A-E illustrate an example message distribution (e.g., a broadcast message) in the network of FIG. 1. For instance, assume that the root node sends a distributed message 500 (e.g., a broadcast message, multicast message, etc.) into the network 100. In FIG. 5A, the message may reach nodes within listening range of the root node, e.g., nodes 11, 12, 13, and 14. As shown in FIG. 5B, each of these nodes repeats the message 500 into the network (each node's transmission shown as a particular line type in the figure). As can be seen in FIG. 5B, in shared medium transmissions (e.g., wireless networks), the actual distribution of the message from a node reaches any node that is within listening distance of the transmission.

For example, node 22 receives the same repeated message from node 11, 12, and 13. These three separate messages must be processed by node 22 to determine whether they are duplicates that do not require repetition, not to mention the fact that each message transmission may interfere with (e.g., collide, conflict, etc.) with node 22's reception of the other messages. That is, if each neighbor nodes of node 22 is attempting to transmit at the same time and over the same frequency band, node 22's links may become overloaded with traffic, and node 22 may be unable to interpret the conflicting signals. In this instance, once the congestion occurs, it may be exacerbated by the fact that the transmitting nodes (distributing nodes) experiencing lost traffic begin to retransmit their traffic for additional attempts, further increasing the amount of traffic at this congested location.

Figure 5C:
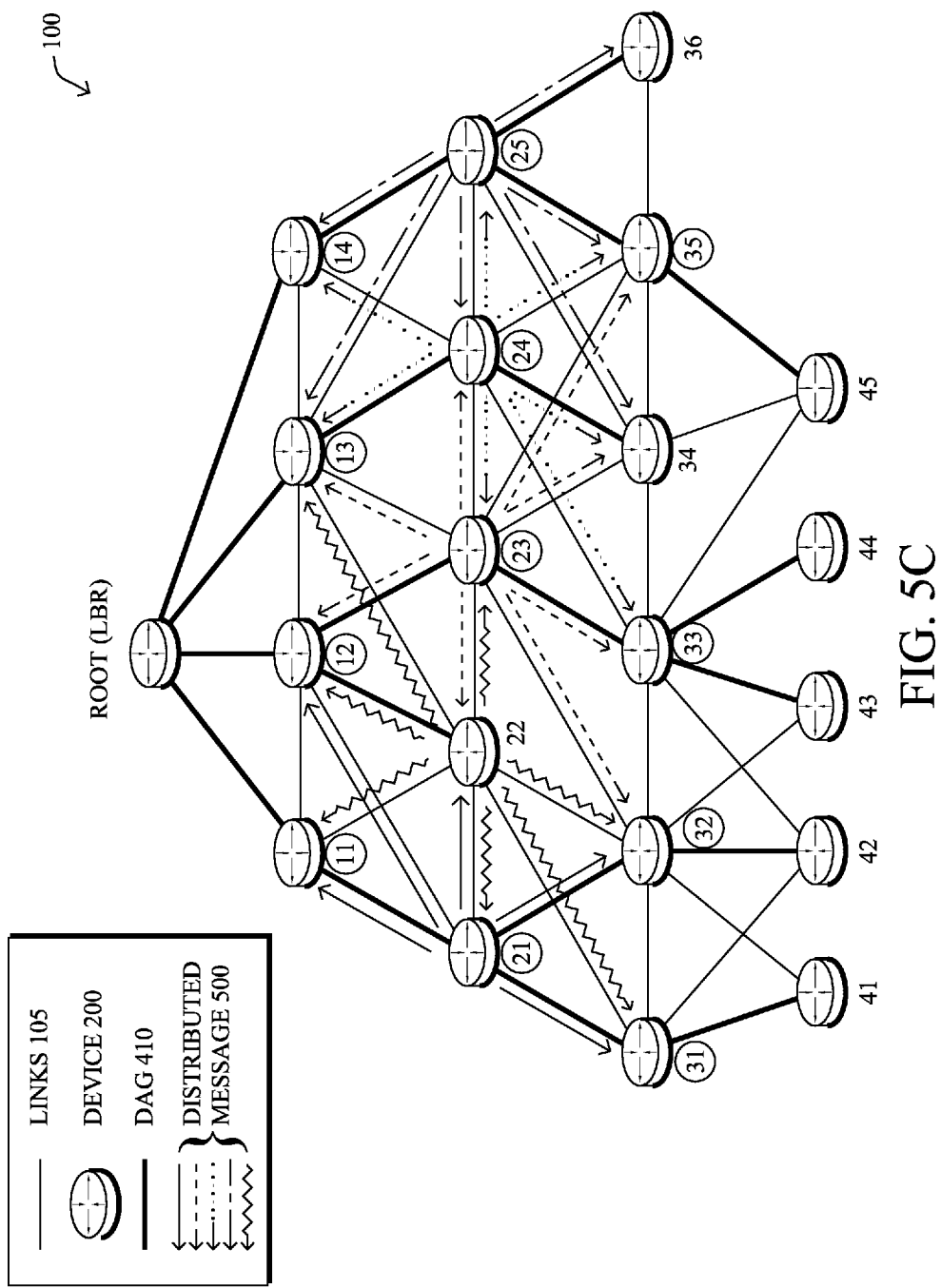
Figure 5D:
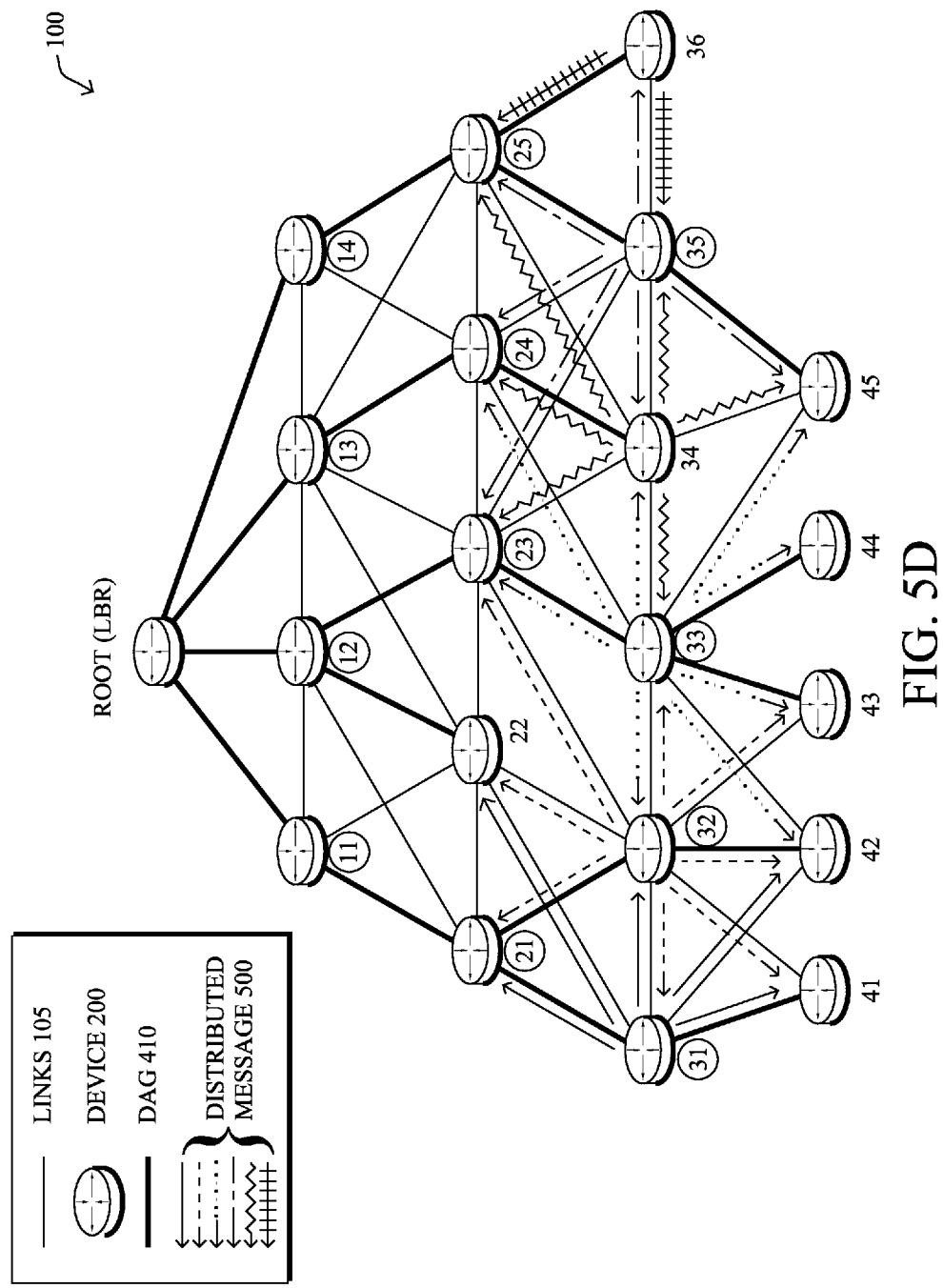
Figure 5E:
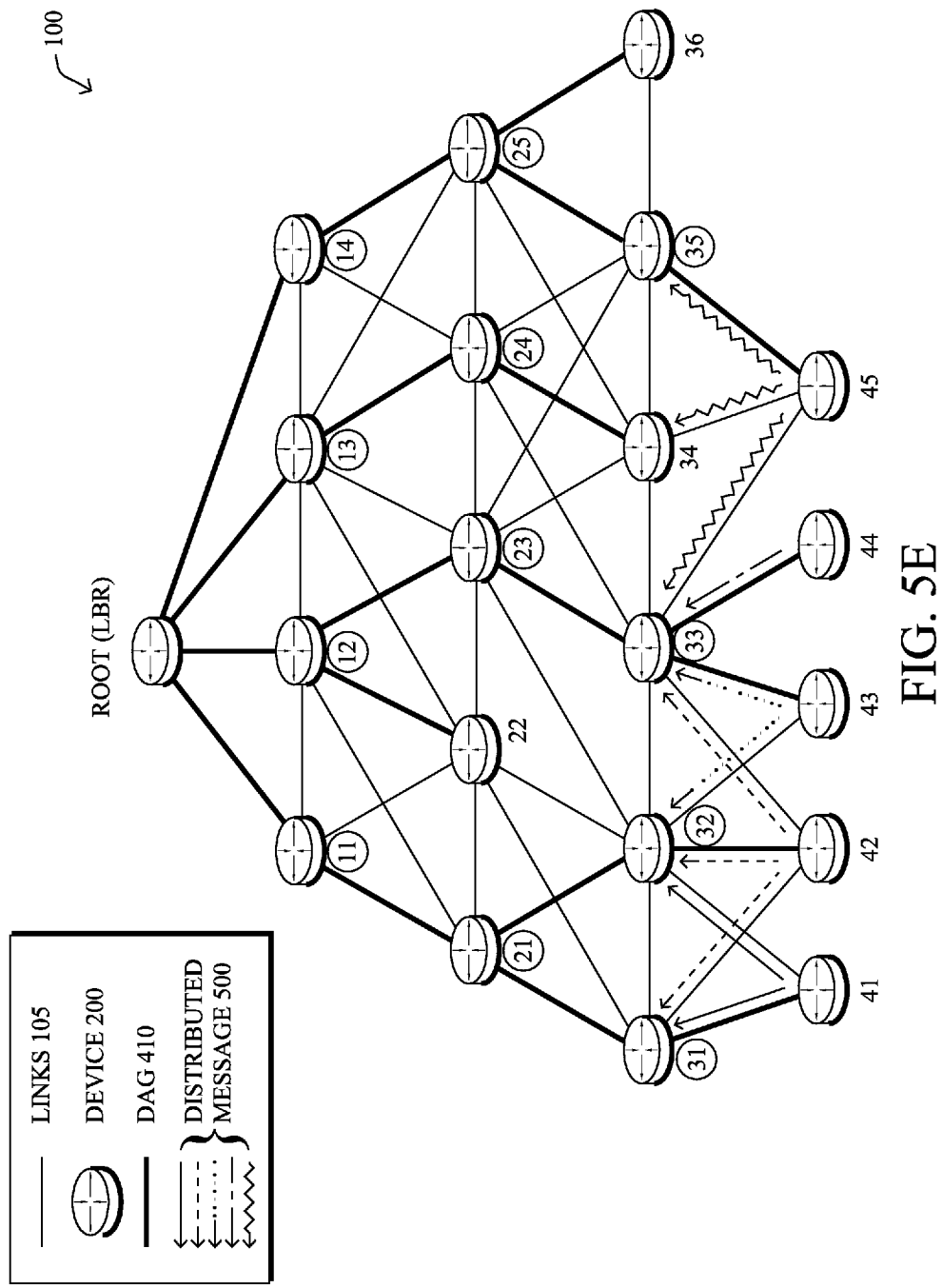

The problem continues into the next levels of retransmission in FIGS. 5C, 5D, and 5E where each node repeats the distributed message 500 into the network, creating further congestion and additional duplicate messages (often referred to as a broadcast "storm"). For example, by the time FIG. 5D is reached in succession, node 22 has received seven copies of the same message. Note that this simplified example also assumes single-hop listening ranges (i.e., node 12 cannot hear node 32's transmission), though this is not always the case, particularly in dense networks, and the problem is increased dramatically in such multi-hop listening range networks. Those skilled in the art will appreciate that transmission from farther nodes which are not marked as direct neighbors may still interfere with the reception of node 22 by increasing the noise floor experienced by node 22.

Note that while the example distribution message 500 in FIGS. 5A-E is a broadcast message (all nodes repeat the message), the example is equally applicable to multicast messages. For multicast messages, only DAG parents (of a multicast tree) repeat the message, thus differing from the examples shown in FIG. 5B (node 22 would not transmit), FIG. 5C, (node 34 would not transmit), and there would be no FIG. 5E equivalent. Though reduced, it can be clearly understood that the multicast example would also suffer from the same problems as the broadcast example above.

Gravitational Parent Selection

The techniques herein provide a mechanism that reduces the number of packet collisions and duplicate packets in a communication network, and hence improves network utilization and efficiency. In particular, as described in greater detail below, the techniques herein attempt to maximize the size of groups which are associated with each parent node in a DAG, such that children "gravitate" to parents with more children. That is, by building a DAG based on the number of children a potential parent node has, parents of big communities keep growing, while parents with small communities keep shrinking, until a reduced number of parent nodes are required in the DAG. The DAG constructed in this manner may be particularly useful for multicast and/or broadcast message distribution (e.g., to limit storms, duplicate messages, congestion, etc.), and as such, is referred to herein as a multicast and broadcast (MaB) DAG. Note that the adaptiveness of the of the techniques herein is key in wireless LLNs where it cannot be determined a priori which nodes will be in listening range of other nodes, which may vary during operation because of link flaps, attenuations, etc.

Specifically, according to one or more embodiments of the disclosure as described in detail below, a particular node in a computer network receives an indication of a number of child nodes of one or more potential parent nodes to the particular node in a primary DAG 410. From this, the particular node selects a particular potential parent node with the highest number of child nodes as a secondary DAG parent for the particular node, and joins the secondary DAG at the selected secondary DAG parent (e.g., for multicast and/or broadcast message distribution). This may recursively continue, such that nodes gravitate toward parents with more children, potentially allowing parents with fewer children to relinquish their parental responsibilities. In one or more additional embodiments, the particular node is also a parent node, and determines a particular number of child nodes that have joined the secondary DAG at the particular node as their parent, and advertises the particular number of child nodes into the network.

Illustratively, the techniques described herein may be performed by hardware, software, and/or firmware, such as in accordance with distributed message management process 248, which may contain computer executable instructions executed by the processor 220 to perform functions relating to the novel techniques described herein, e.g., in conjunction with DAG process 246. For example, the techniques herein may be treated as extensions to conventional protocols, such as the RPL protocol, and as such, would be processed by similar components understood in the art that execute the RPL protocol, accordingly.

Operationally, the techniques herein may start with an initial primary DAG 410, e.g., originally computed in FIG. 4 above (e.g., by RPL), which is used for message delivery between the DAG root and nodes in the mesh (e.g., unicast messages). For example, a primary DAG 410 may be built with no configuration (e.g., "DAG 0"), where each node of the DAG may select a parent node based on any number of factors, such as signal strength, media access control (MAC) addresses, random selection, etc. Note that here, and in gravitation parent selection below, nodes may generally determine whether they can receive messages directly from a root node of the DAG, and if so, join the DAG at the root node (e.g., nodes 11, 12, 13, and 14).

Based on this primary DAG 410, a secondary DAG, e.g., a multicast and broadcast (MaB) DAG, is established as a copy of the primary DAG 410, such that nodes in the MaB DAG have the same parents as in the primary DAG. From here, nodes may determine a particular number of child nodes that have joined the secondary DAG at that particular node as their parent. This number may be referred to as a "size" of a group or community at the parent node. The parent's size, then, may be advertised into the network (e.g. using local multicast messages), i.e., advertising the particular number of child nodes into the network for the particular node.

Figure 6:
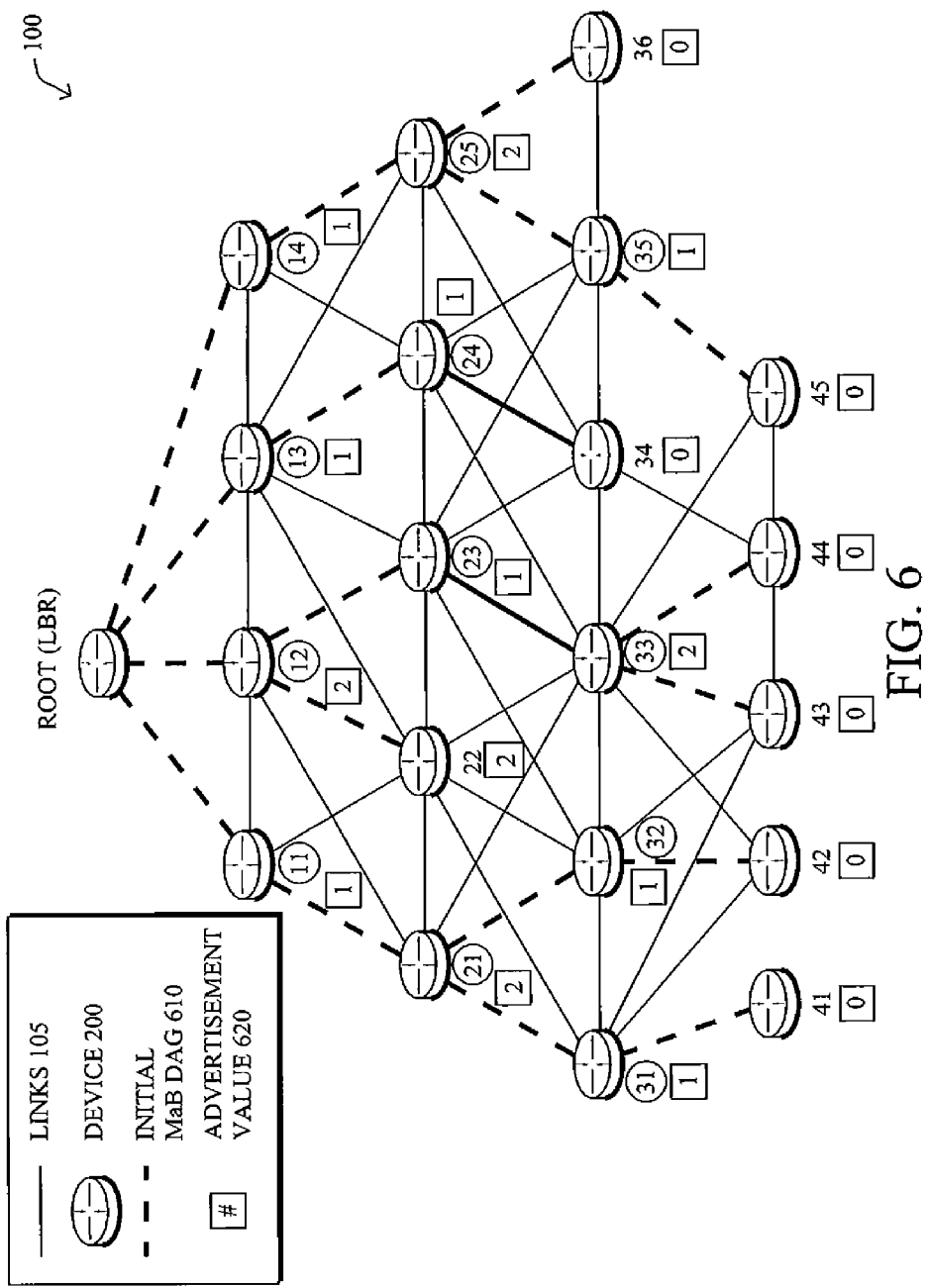
FIG. 6 illustrates an example of parent nodes advertising their number of children in a multicast and broadcast (MaB) DAG.

FIG. 6 illustrates an example of such an advertisement value as sent out from each node in the network based on the initial state of the MaB DAG 610 (e.g., the copy of primary DAG 410). Generally, the advertisements 620 (values 620) from each node need only traverse away from the DAG root, though it will be appreciated that in a shared media network, the actual advertisements can be heard by any neighboring device within listening distance. The number associated with each advertisement 620 in FIG. 6 illustrates the number of child nodes a particular parent node (circled ID number) has in MaB DAG 610, and that is advertised over each link (e.g., through the shared medium locally) from the node in question.

Note that in one or more embodiments herein, it may be possible to adjust the particular number of child nodes that is advertised, thus "weighting" the advertising node. For example, to increase the "gravitational pull" of a particular node in the network, a phantom number of child nodes may be added to the actual number, such that more child nodes could be attracted to the weighted node. (In the alternative, to reduce the number of attracted child nodes, this adjusted value could be a reduction, i.e., advertising fewer child nodes that are actually depending on the connected parent node for receiving multicast and/or broadcast messages). For example, as shown in FIG. 6, node 22 is advertising two child nodes, even though node 22 does not actually have two child nodes (it in fact has none in the initial MaB DAG 610). This might be an appealing approach with nodes with high computational capabilities and/or available energy (e.g. nodes that are not battery powered).

As the child nodes receive these indications of the number of child nodes of one or more of its potential parent nodes, the gravitational parent selection herein arises when those child nodes reselect a particular potential parent node with the highest number of child nodes as their MaB DAG parent (and then join the MaB DAG at the newly selected DAG parent).

Figure 7:
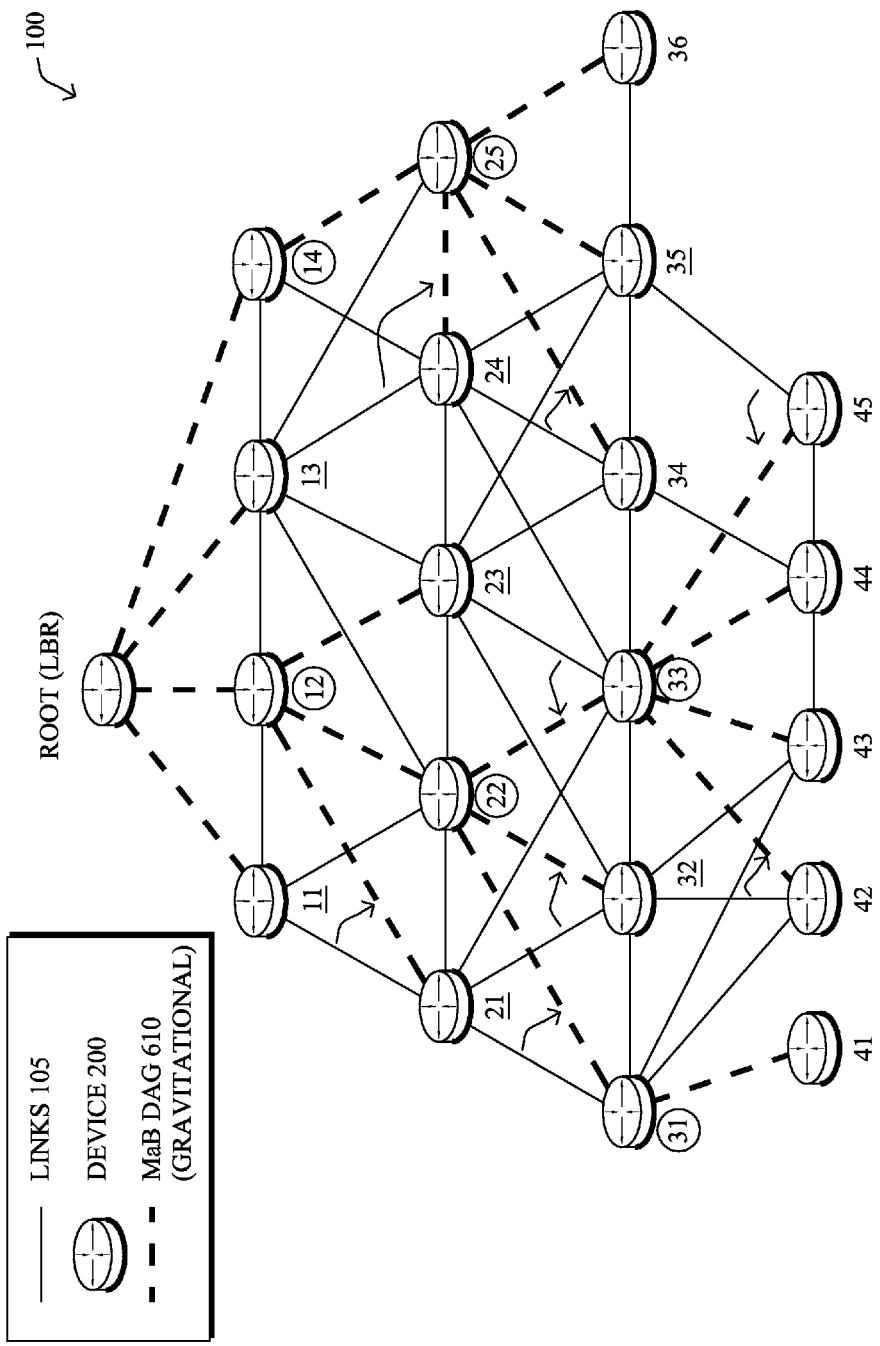
FIG. 7 illustrates an example of gravitational parent selection.

FIG. 7 illustrates an example updated "gravitational" MaB DAG 610 based on each node having one chance to change their MaB DAG parent selection based on the number of child nodes each potential parent node had in the previous version of MaB DAG 610 of FIG. 6. As shown in FIG. 7, nodes 42 and 45 both adaptively select node 33 as their new DAG parent, alleviating nodes 32 and 35, respectively, from having to be a parent node any longer (the change in DAG parent status indicated by an underlined node ID). Also, node 21 selects node 12, and node 34 selects node 25 based on the potential parents' child numbers advertised in FIG. 6 above. Further, node 24 is shown adopting node 25 as its parent, thus alleviating node 13 from the need to repeat the distributed messages 500 (multicast and/or broadcast messages) on the MaB DAG. This is an important example as it shows how the MaB DAG may be optimized by nodes selecting peer nodes (siblings, same-rank) with significant gravity as MaB DAG parents. Note that provisions may be emplaced to ensure that the sibling, or at least one sibling in a series of sibling selections, has a distributing parent at a lower rank (closer to the root) in order to provide connectivity to the root node of the MaB DAG.

Note how nodes 31 and 32 both gravitate toward node 22 due to the adjusted/weighted value (e.g., "two" children) from node 22. Note further that where sizes of two potential parents are the same, such as is the case for node 33 selecting between nodes 21 and 22 (granted, node 22 is a "fake" adjusted/weighted value), a selection between the multiple same-numbered parent options may be made. In other words, when two or more of the potential parent nodes have the same highest number of child nodes, a child node may select one of the two or more potential parent nodes having the same highest number as the MaB DAG parent. This selection may be random, or else may be deterministic, such using a highest or lowest MAC, or other deterministic measures where each node in the network given the same set of choices would make the same selection.

In one or more embodiments herein, if a child node has a single option for a MaB DAG parent, then that single option parent must assume the role of a MaB DAG parent. That is, a MaB DAG parent may determine that it must be a parent for at least one particular node, then it may broadcast (locally) an indication of this into the network. Any node that receives this indication may then select that "mandatory" parent. Alternatively, a "mandatory" parent may be configurable, such as being "mandatory" because it is a node with high computational power, is not battery operated (e.g., is "main-powered, etc.).

Figure 8A:
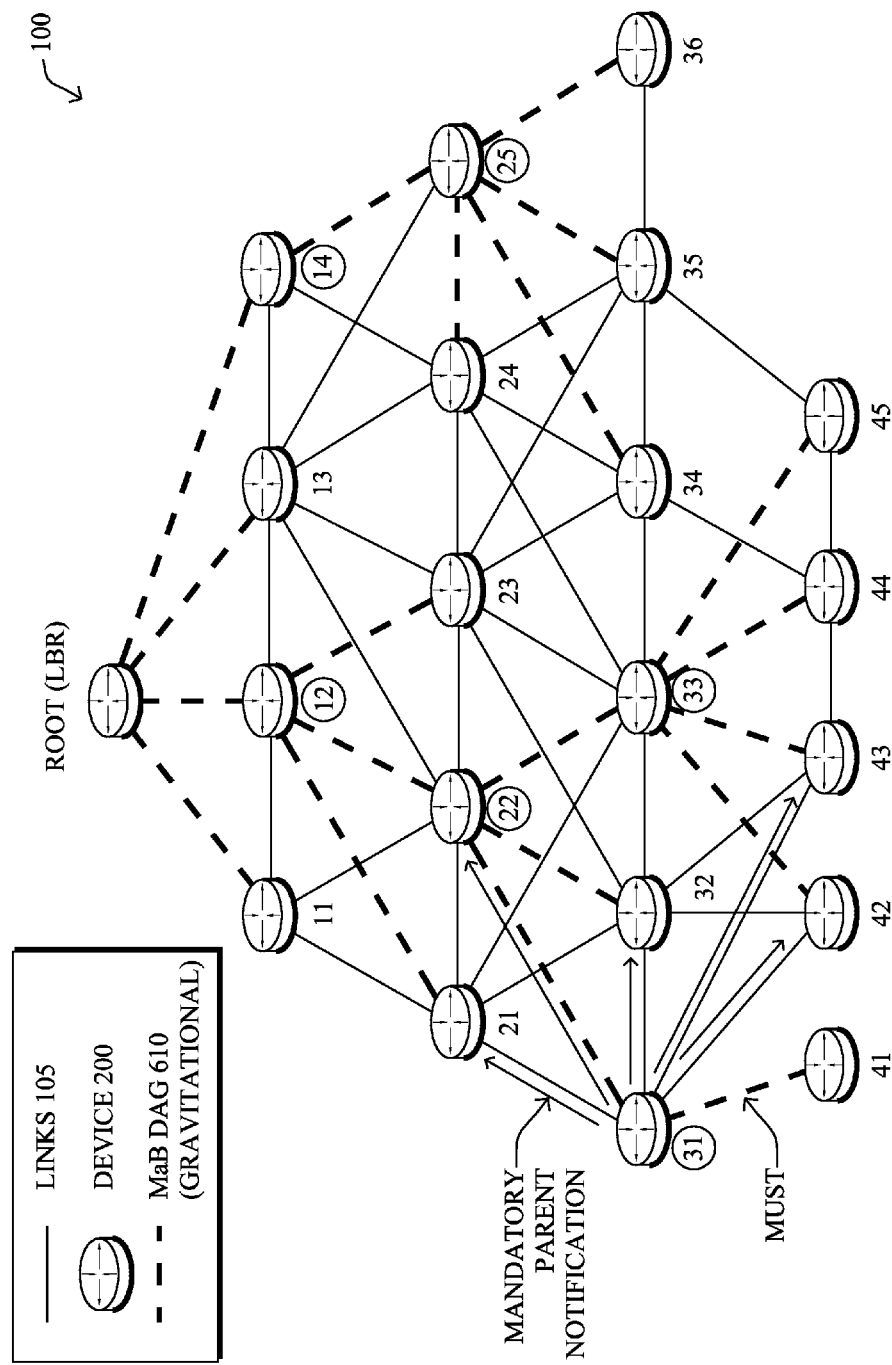
FIGS. 8A-B illustrate an example of mandatory gravitational parent selection.
Figure 8B:
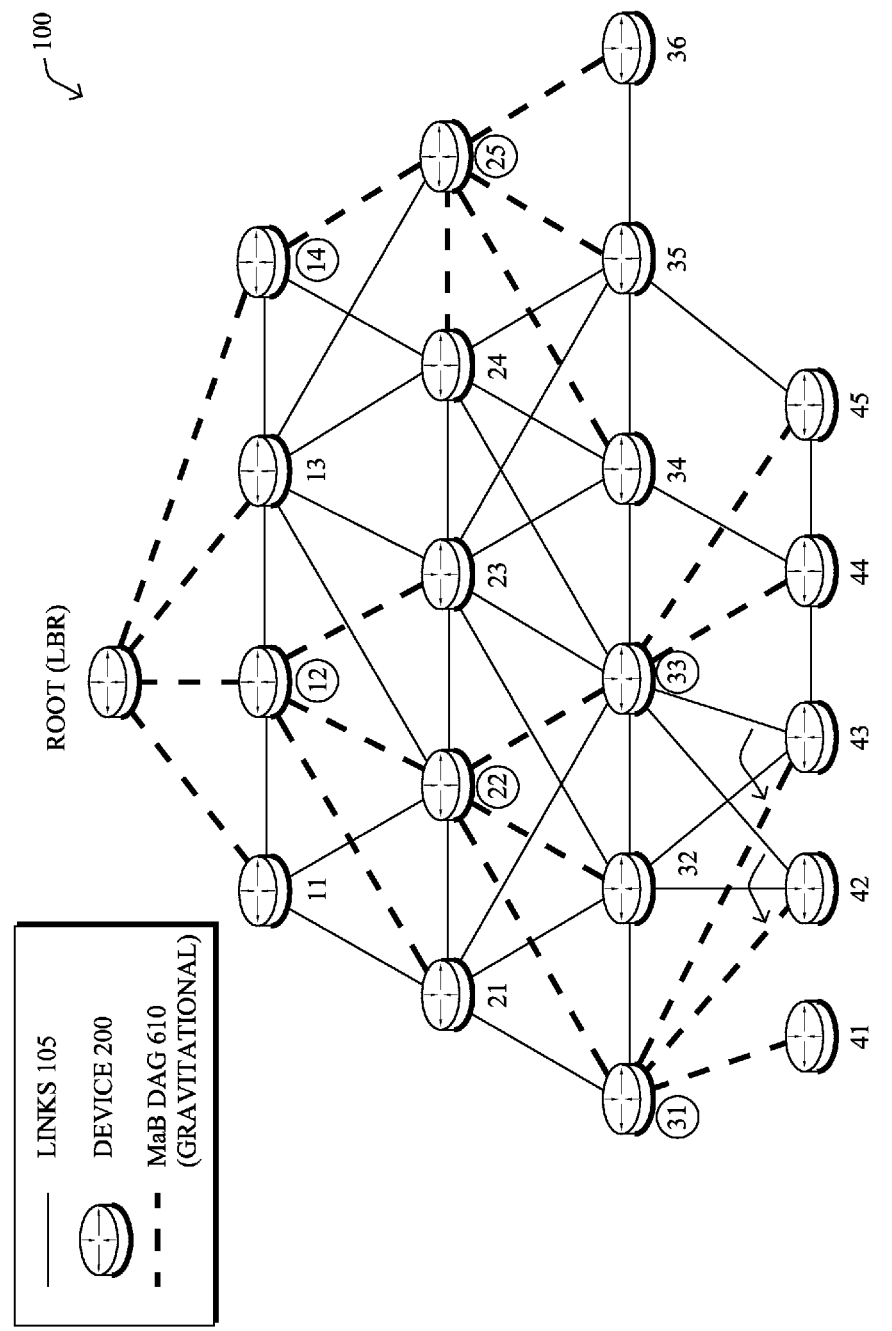

FIG. 8A illustrates an example of this, where parent node 31 must be the node that forwards/repeats messages to node 41. For example, this can be determined based on knowledge of the topology, or from an explicit indication from node 41 (e.g., a neighbor table, a flag in DIO message 300, etc.) showing that node 31 is the only node that can reach node 41. Accordingly, once node 31 notifies its other neighbors that it must be a parent, then those neighbors, such as node 42 and 43, may alter their selection to the mandatory MaB DAG parent, as shown in FIG. 8B. In this illustrative example, this change does not alleviate any nodes from being parents, but often in implemented topologies this could be case. The fact that a parent node must be a parent for another node is a strong reason to select that node as a parent, since that node will always be a parent in the MaB DAG. Hence, if another parent may be relieved of its duties by using the mandatory parent instead, then a key component of the gravitation parent selection techniques herein has been achieved.

Said differently, FIGS. 8A and 8B illustrate that when a node determines that it has only one available potential parent node, it selects that one available potential parent node as its MaB DAG parent, and may notify the MaB DAG parent that it is the particular node's only available potential parent node. When the MaB DAG parent receives the notification, the MaB DAG parent can then advertise that it must be a parent node into the network. Now, any other node receiving that notification/advertisement may select the mandatory parent as their MaB DAG parent. Note that as mentioned above, if there are two otherwise equal mandatory parent choices available to a child node, one of the potential parent nodes may be selected in a variety of manners.

Figure 9A:
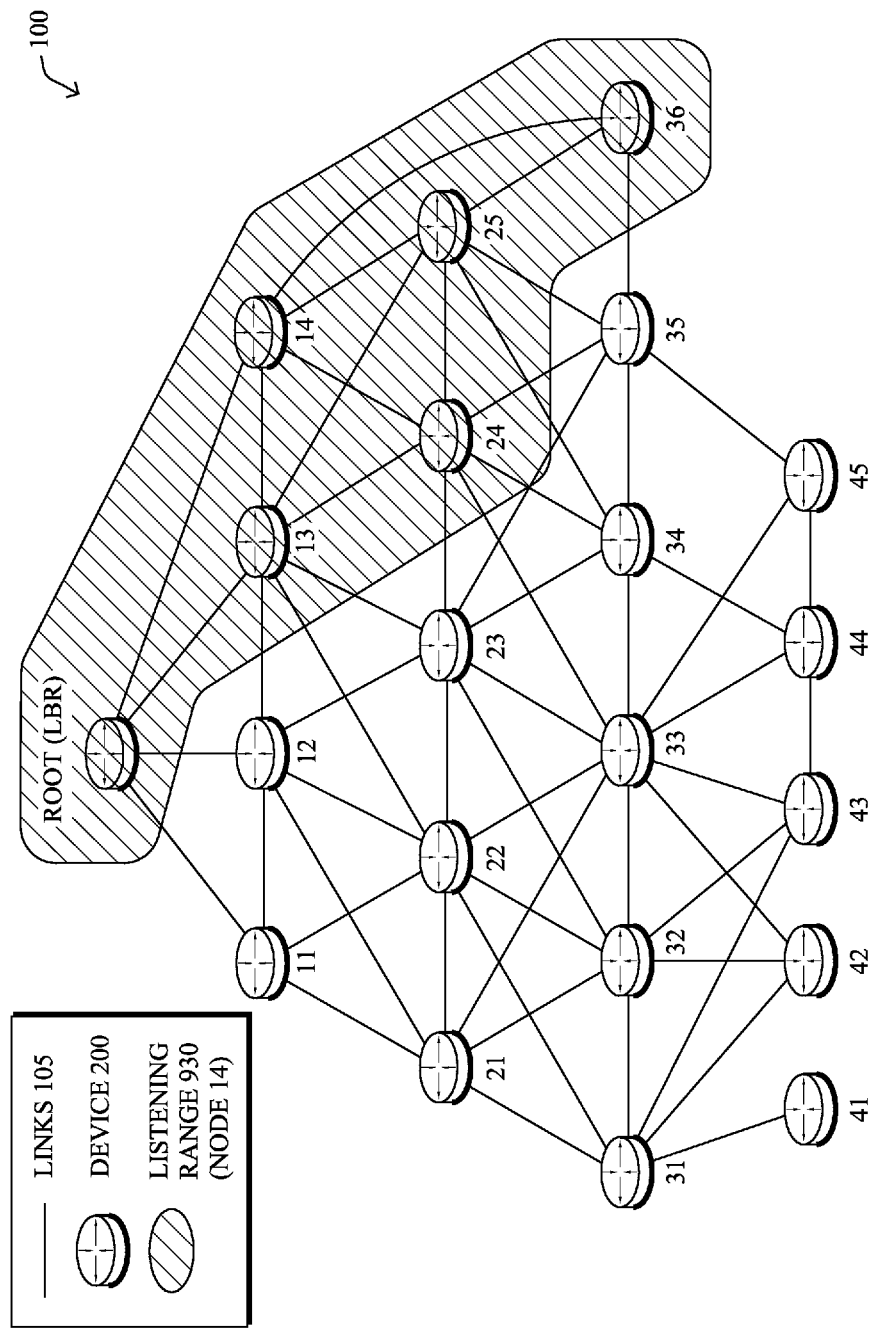
FIGS. 9A-B illustrate an example of grandparent selection.

In accordance with one or more additional embodiments herein, each parent node may advertise its own parents as well. That is, children may gravitate towards the parent of a potential parent, as it may reduce the need of the (middle) parent to retransmit. FIG. 9A illustrates an example listening range 930 of a "grandparent" node 14, which is node 25's parent. Node 25 may thus advertise its parent's identification, such that if any of node 25's child nodes (e.g., nodes 34, 35, or 36) determine that they can receive messages directly from the grandparent node (beyond the selected DAG parent), then those nodes may bypass the originally selected parent and join the gravitational DAG 610 at the grandparent node.

Figure 9B:
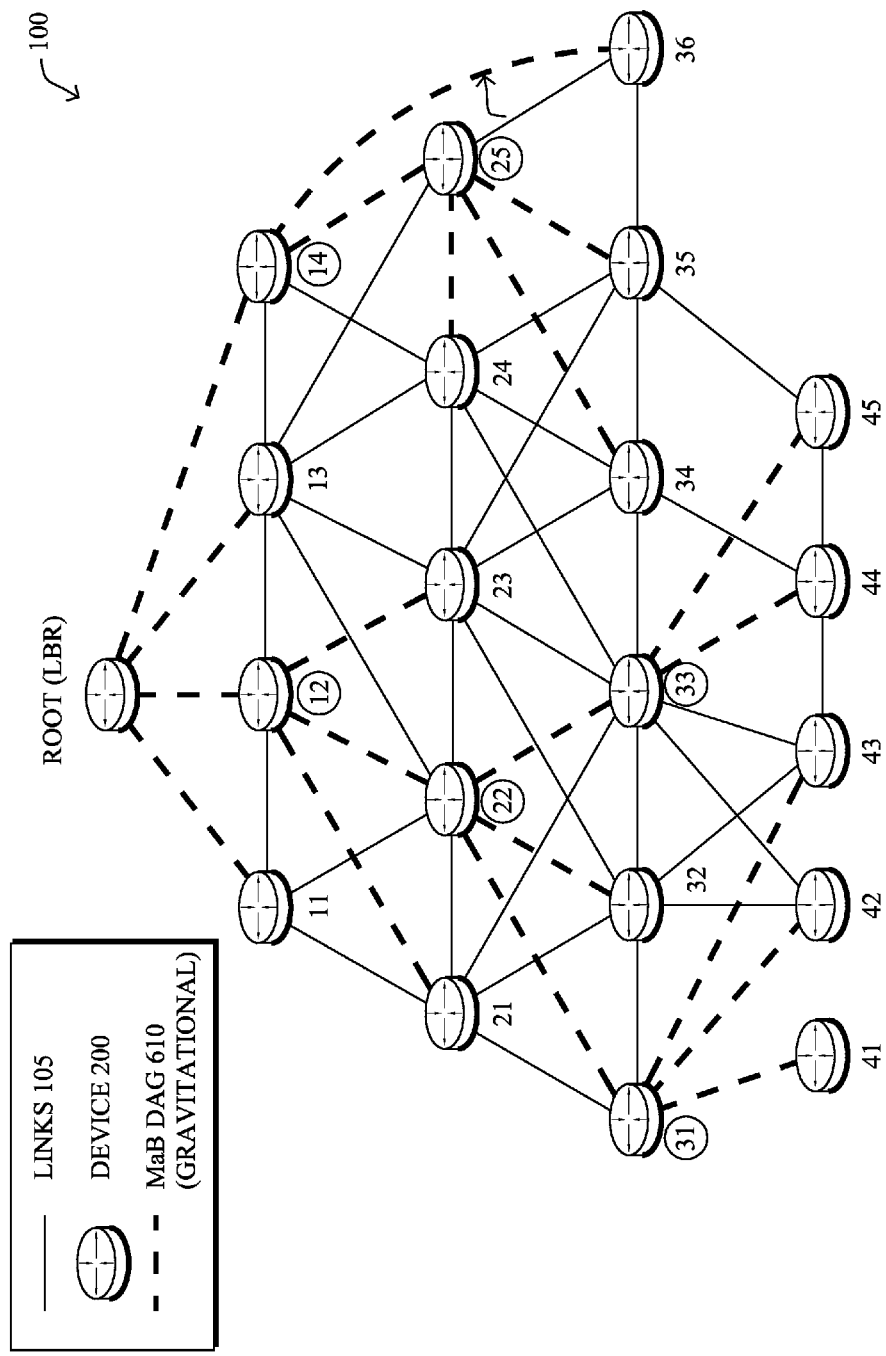

Based on the listening range 930, it appears that node 36 is able to hear the grandparent node 14, and as such, in FIG. 9B, is shown re-joining the DAG at node 14. Though in this instance, the change in MaB DAG parent selection does not alleviate node 25's duties as a parent, as will be seen below, the change may have caused other differences to the network. Note also that in other topologies, such a change might be more substantial (e.g., particularly in dense networks), where entire groups of nodes might utilize their grandparents, removing the original parent's responsibilities as a "middleman" to the grandparent.

Figure 10:
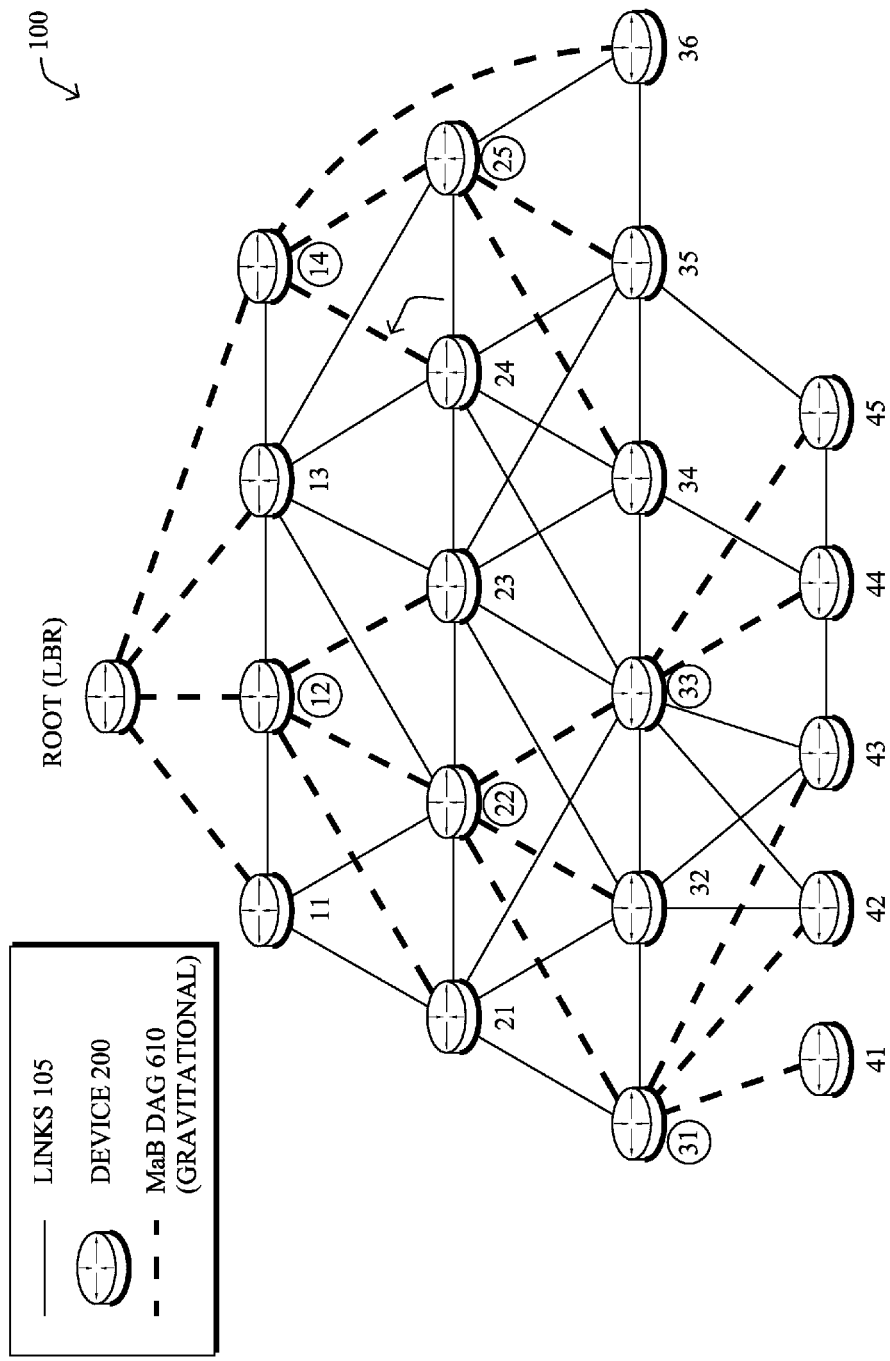
FIG. 10 illustrates an example of recursive gravitational parent selection.

Furthermore, the example of grandparent selection may alternatively reference not a grandparent of the selecting node, but a parent of a selected MaB DAG parent. In particular, the difference between these two choices is evident when a sibling of a selecting node has a large gravitational pull. For example, as shown in FIG. 10, node 24 may determine that its selected MaB DAG parent node 25's parent is node 14. As such, node 24 may reselect node 14 as its MaB DAG parent.

As noted above, the gravitational DAG parent selection process is recursive, in that updates to the topology create newly advertised values, which may induce further DAG parent selection. For example, as new parents are selected, and child nodes make parental migrations within the MaB DAG 610, the advertised gravitational values 620 may change, further prompting more migration. Those skilled in the art will appreciate that the example topology shown herein is merely a simplified example, and that the recursive nature of the techniques described herein may incorporate many more iterations to achieve a "final" stable result. Note also that even this stable result in any network topology may change based on changes to the topology itself (e.g., signal strength changes, link changes, etc.).

Notably, for redundancy, in one or more embodiments each node may select a plurality of distributing nodes to be a plurality of redundant MaB DAG parents from which redundant distributed messages are to be received by the particular node. That is, though the above was generally described wherein each node attempts to secure a single MaB parent, in one or more embodiments herein the nodes may seek to secure N (e.g., 3) MaB parents for redundancy, such as the top three most gravitational parents, i.e., those parent options with the top three most number of children.

Figure 11:
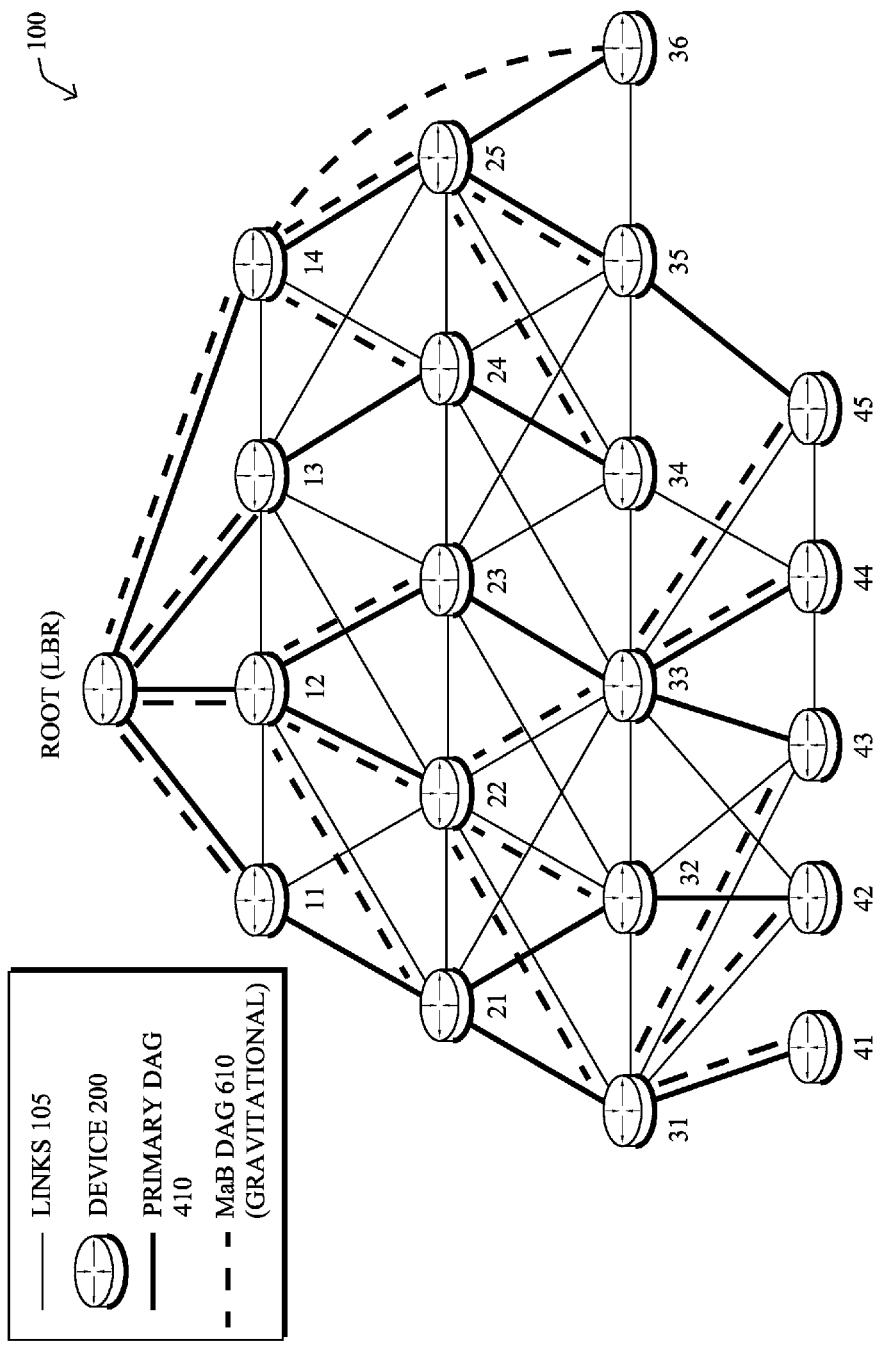
FIG. 11 illustrates an example of the MaB DAG overlaying the primary DAG of FIG. 4.

As shown in FIG. 11, the primary DAG 410 may be built based on certain desired properties (e.g., a certain objective function as noted above), while the MaB DAG 610 may be created for the specific purpose of distributed messages. These two DAGs are maintained in parallel by routing process 244 (and/or DAG process 246) and are used accordingly for delivery of messages according to their classification (unicast or multicast/broadcast). Consequently, in the embodiment shown in FIG. 11, each DAG parent of the primary DAG 410 may take ownership of making sure that its children are getting the distributed (multicast/broadcast) message 500, either from the original parent (itself) or from a new MaB DAG parent.

For example, after getting an acknowledgement from the select MaB DAG parent(s) that they will send distributed messages for the particular node, each particular node may then send a message to its original primary DAG parent (a parent on the primary DAG tree 410) advising its primary DAG parent that it is no longer needed for obtaining the distributed messages. That is, in response to the selected MaB DAG parent(s) not being the particular node's primary DAG parent, the particular node informs the primary DAG parent that the primary DAG parent need not send distributed messages for the particular node. Note that the particular node may also notify its primary DAG parent of IDs (and/or MAC addresses) of the nodes from which it plans to obtain distributed messages, i.e., a list of one or more distributing parents of the particular node.

If a primary DAG parent node obtains notifications from all of its children notifying it that they no longer rely on it for obtaining distributed (i.e., broadcast or multicast) messages, and if the primary DAG parent did not receive a request from any other node to become its MaB DAG parent, the primary DAG parent node may set a corresponding state (e.g., for the MaB DAG) to a non-distributing node (e.g., to a broadcast packet non-repeating state) to thus prevent repeating of distributed messages. Conversely, in response to receiving a notification that some node is using a particular node as a MaB DAG parent, then the operating state of that node (whether a DAG parent or not) is set to a MaB DAG (distributing) parent, to thus repeat distributed messages 500 in a MaB DAG. In a dense deployment, this stops a large percentage of nodes from retransmitting distributed messages (i.e., broadcast and multicast packets).

Figure 12A:
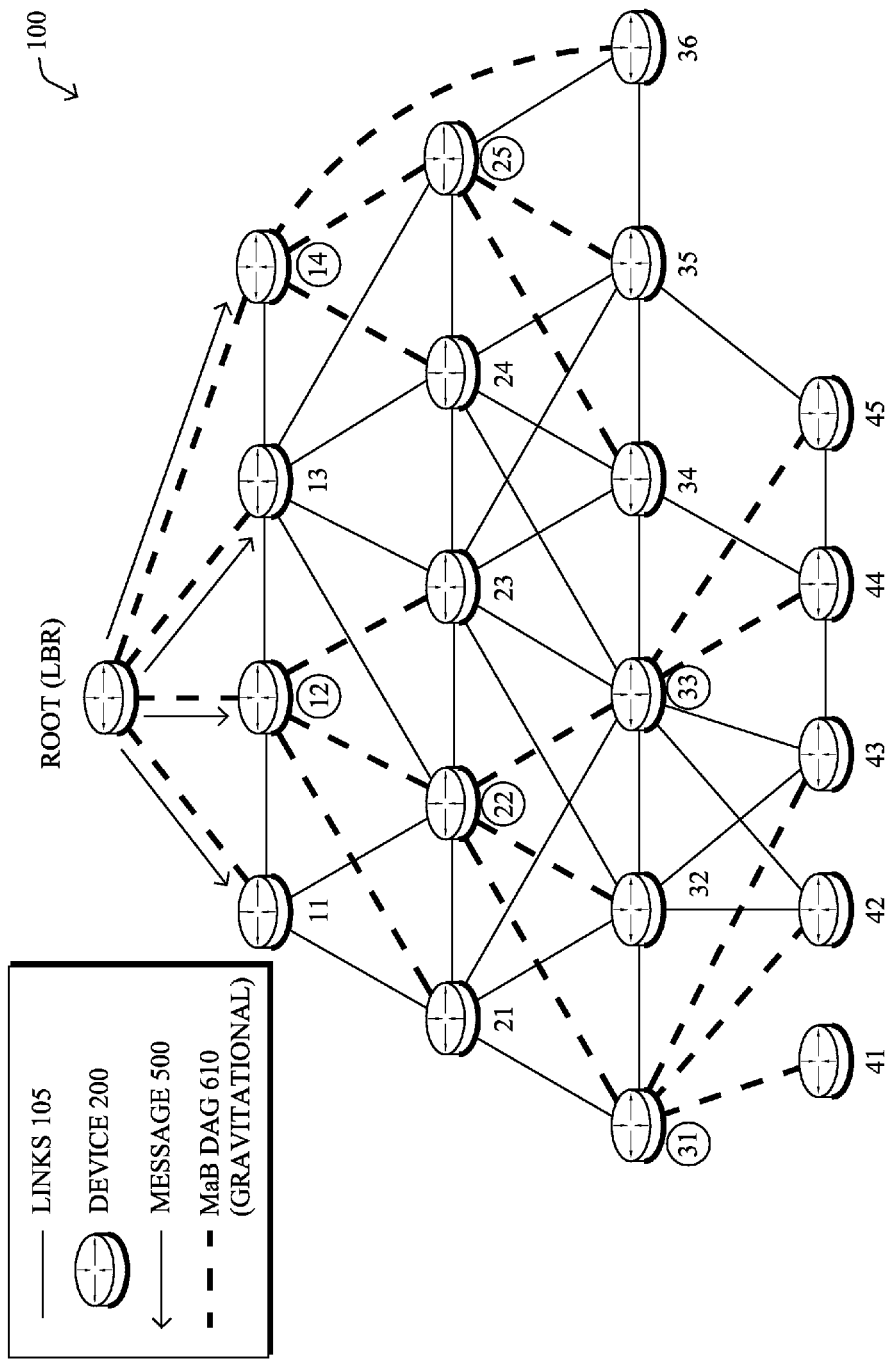
FIGS. 12A-D illustrate an example of a message traversing the gravitationally created MaB DAG.
Figure 12B:
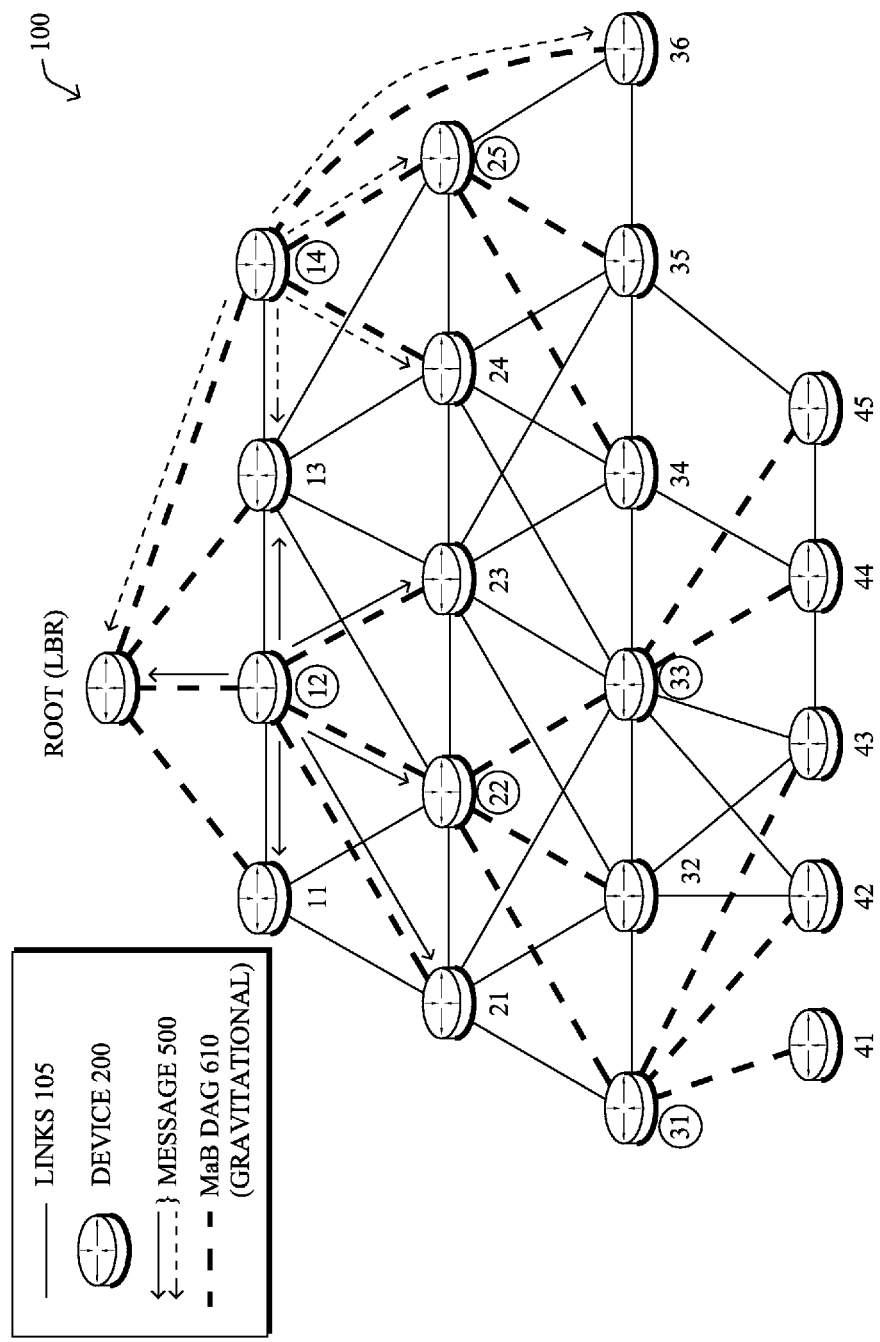
Figure 12C:
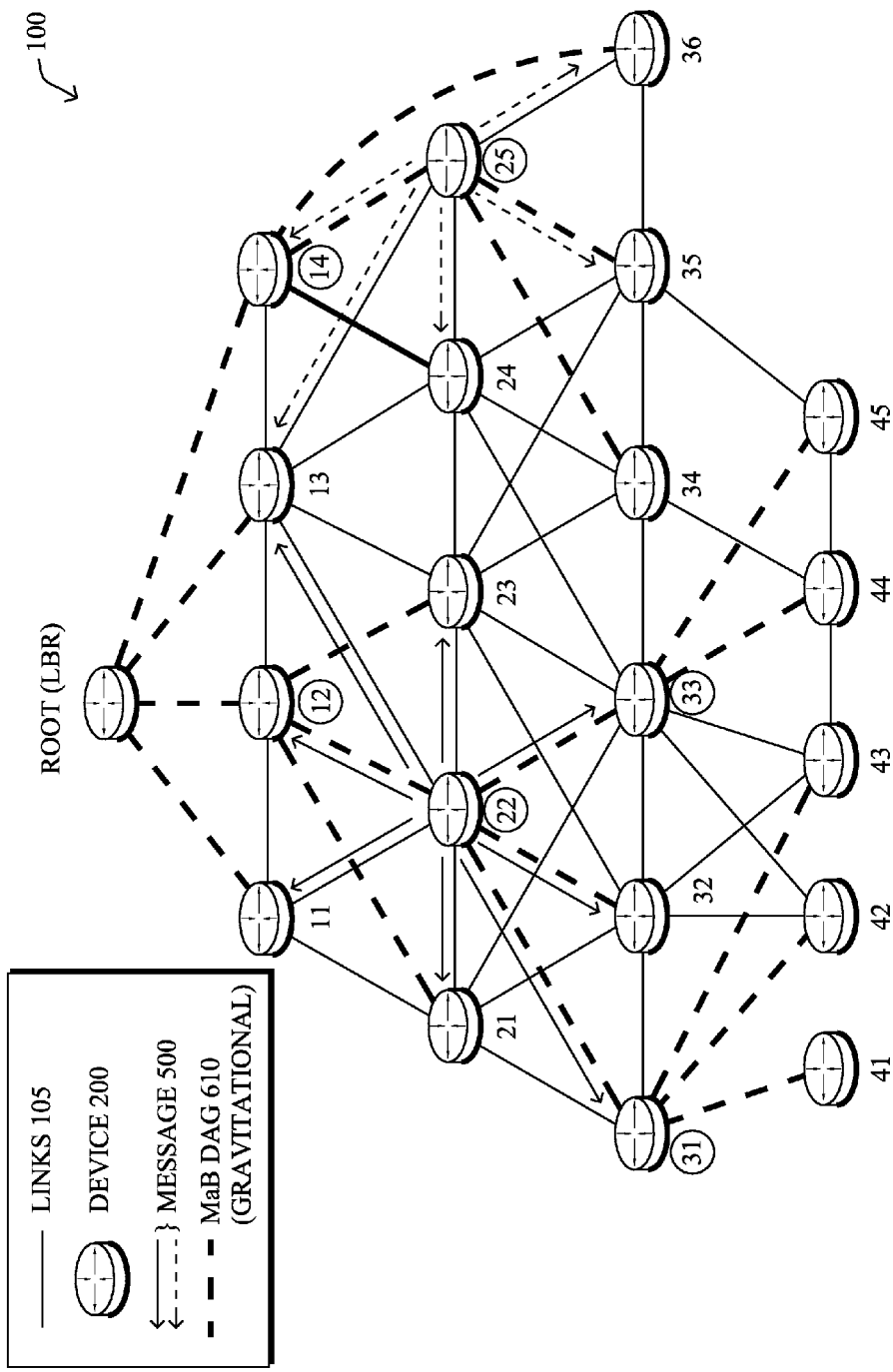
Figure 12D:
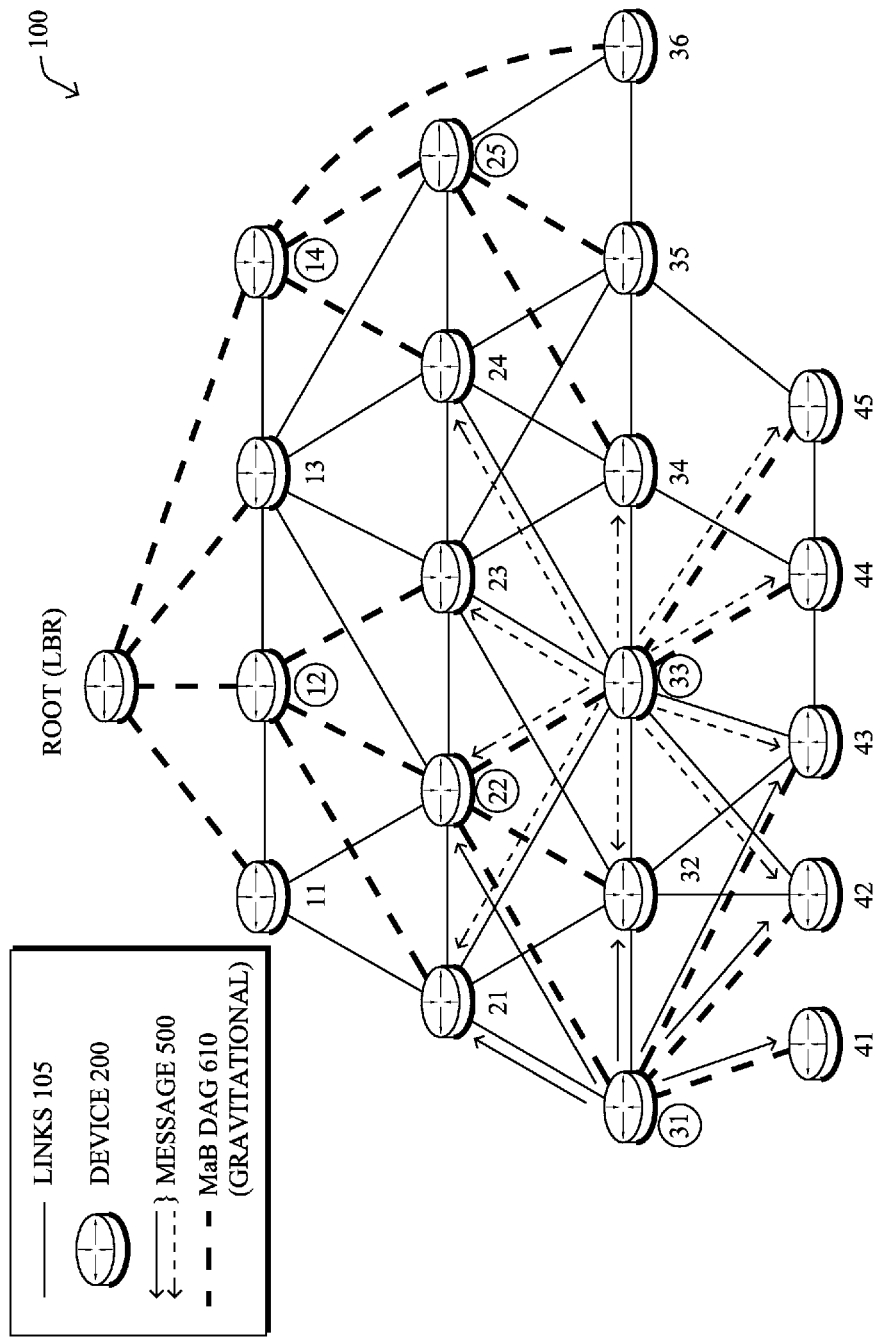

FIGS. 12A-D illustrate an example message transmission on the MaB (gravitational) DAG 610 as last enhanced in FIG. 10 above. Similar to FIG. 5A, FIG. 12A shows the first stage of a broadcast message initiated by the root node, reaching nodes 11, 12, 13, and 14. Contrary to all of these nodes repeating the transmission (as they did in FIG. 5B), however, FIG. 12B illustrates how only the selected distribution parents, nodes 12 and 14, repeat/forward the message 500. Though it is readily apparent that the traffic in the network is already greatly reduced, and thus so are the congestion and processing utilization at the nodes, FIGS. 12C and 12D continue the progression of the message 500 through the MaB DAG 610. According to the techniques herein, therefore, each node in the network 100 has received a copy of the message 500 by FIG. 12D, and the excess traffic was much reduced in comparison to FIGS. 5A-E. That is, where before twenty of twenty nodes repeated the message in FIGS. 5A-E, now only six adaptively (gravitationally) selected nodes repeated the message 500 in FIGS. 12A-D based on the techniques herein.

Figure 13A:
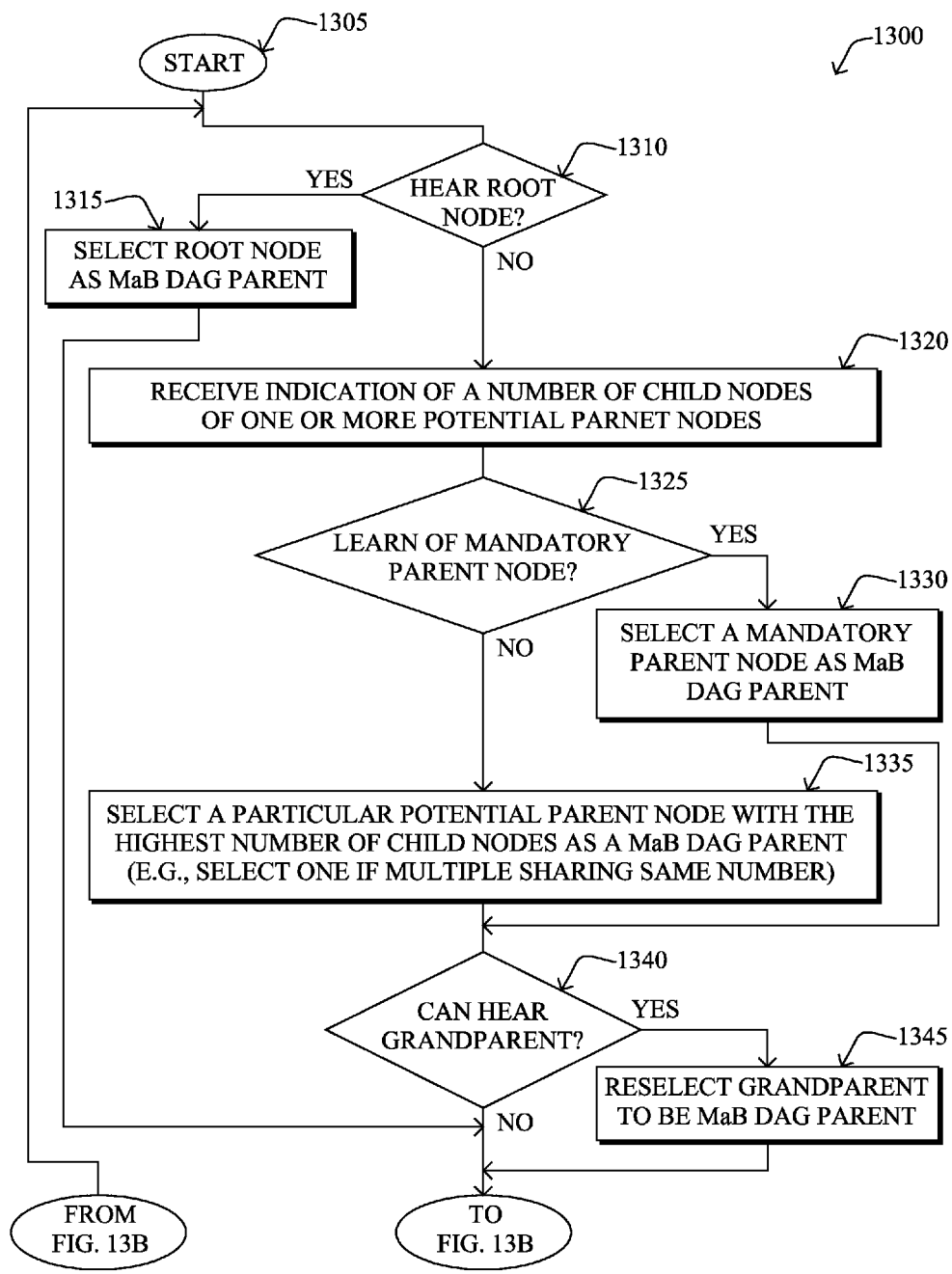
FIGS. 13A-B illustrate an example simplified procedure for gravitationally selecting MaB DAG parents, from the perspective of the child nodes.
Figure 13B:
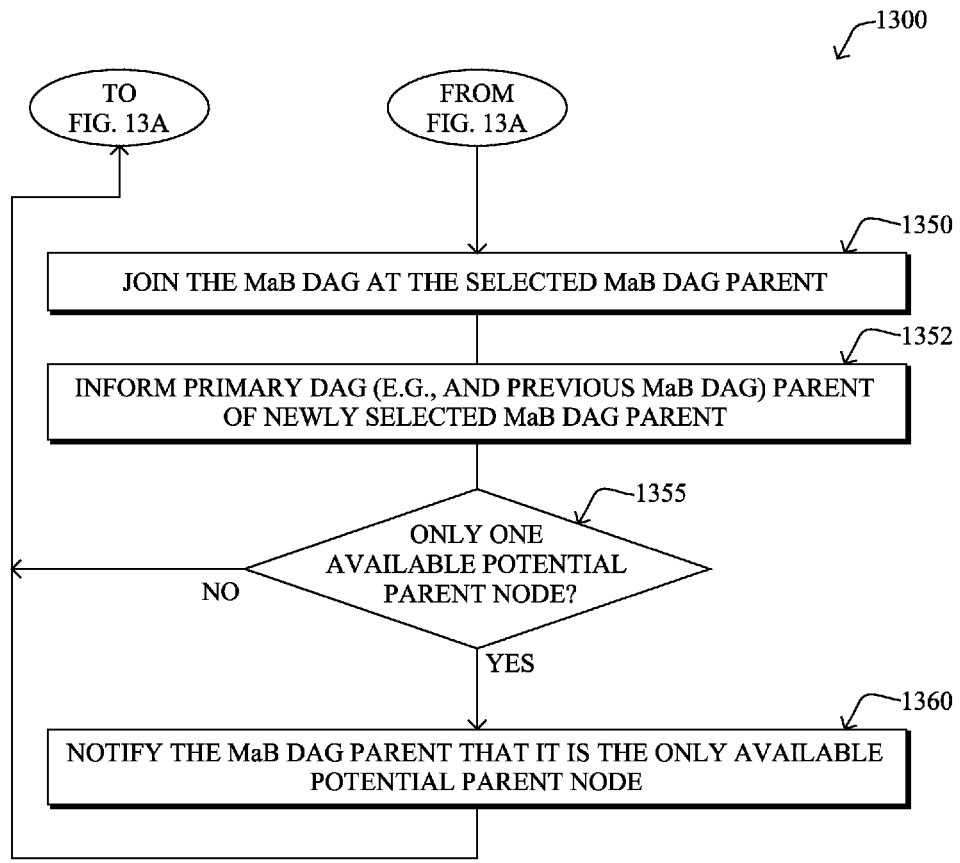

FIGS. 13A-B illustrate an example simplified procedure for gravitationally selecting MaB DAG parents in accordance with one or more embodiments described herein, e.g., from the perspective of a node selecting a parent. The procedure 1300 starts at step 1305, and continues to step 1310, where if a node determines that it can hear the root node, then in step 1315 that node selects the root node as its MaB DAG parent (e.g., as do nodes 11, 12, 13, and 14). In step 1320, nodes not within listening range of the root may receive an indication of a number of child nodes of one or more potential parent nodes, as described above. As also mentioned above, if in step 1325 one of those potential parent nodes indicates that it is a mandatory parent node for a particular one of its children, then in step 1330 any nodes capable of selecting that mandatory parent node as a MaB DAG parent may do so.

Similarly all other nodes may then proceed to select a particular potential parent node with the highest number of child nodes as a MaB DAG parent in step 1335 as described in detail above. Also, where multiple potential parents have the same number of child nodes, the selecting node may decide based on various "tie-breaker" factors as described above to select one of the potential parents, such as MAC address, signal strength, etc. Note that once a DAG parent is selected, then if in step 1340 a node is within listening range of (can hear) the parent of the selected DAG parent (e.g., a grandparent), then in step 1345 the node may reselect the grandparent to be its DAG parent.

Continuing to FIG. 13B, the node may then join the MaB DAG 610 in step 1350 at the selected MaB DAG parent, accordingly. Since the MaB DAG is illustratively initialized by copying the original primary DAG 410 which defines a parent for each child, if the newly selected MaB DAG parent is different than the previous parent, then the child node may notify the previous parent in step 1352 that it will no longer depend on it for receiving a multicast or broadcast messages as it has identified a new MaB DAG parent from which it will be receiving such messages.

As mentioned above, in the event that there is only a single available potential parent node in step 1355 (i.e., the MaB DAG parent selected being the only choice for the node), then in step 1360 the node may notify its MaB DAG parent that it is the only available potential parent node, e.g., such that other nodes may gravitate toward the mandatory MaB DAG parent (e.g., in step 1325 above). The procedure recursively continues to step 1310 to learn new numbers of children, and may create new MaB DAG parent selections gravitationally toward larger "families," while parent nodes with fewer children may eventually no longer need to be parent nodes (i.e., once all of their children have found other parent nodes). Nodes which loss all of their gravitational children change their state and stop retransmitting multicast and broadcast messages, thus improving the operation and efficiency of the network.

Figure 14A:
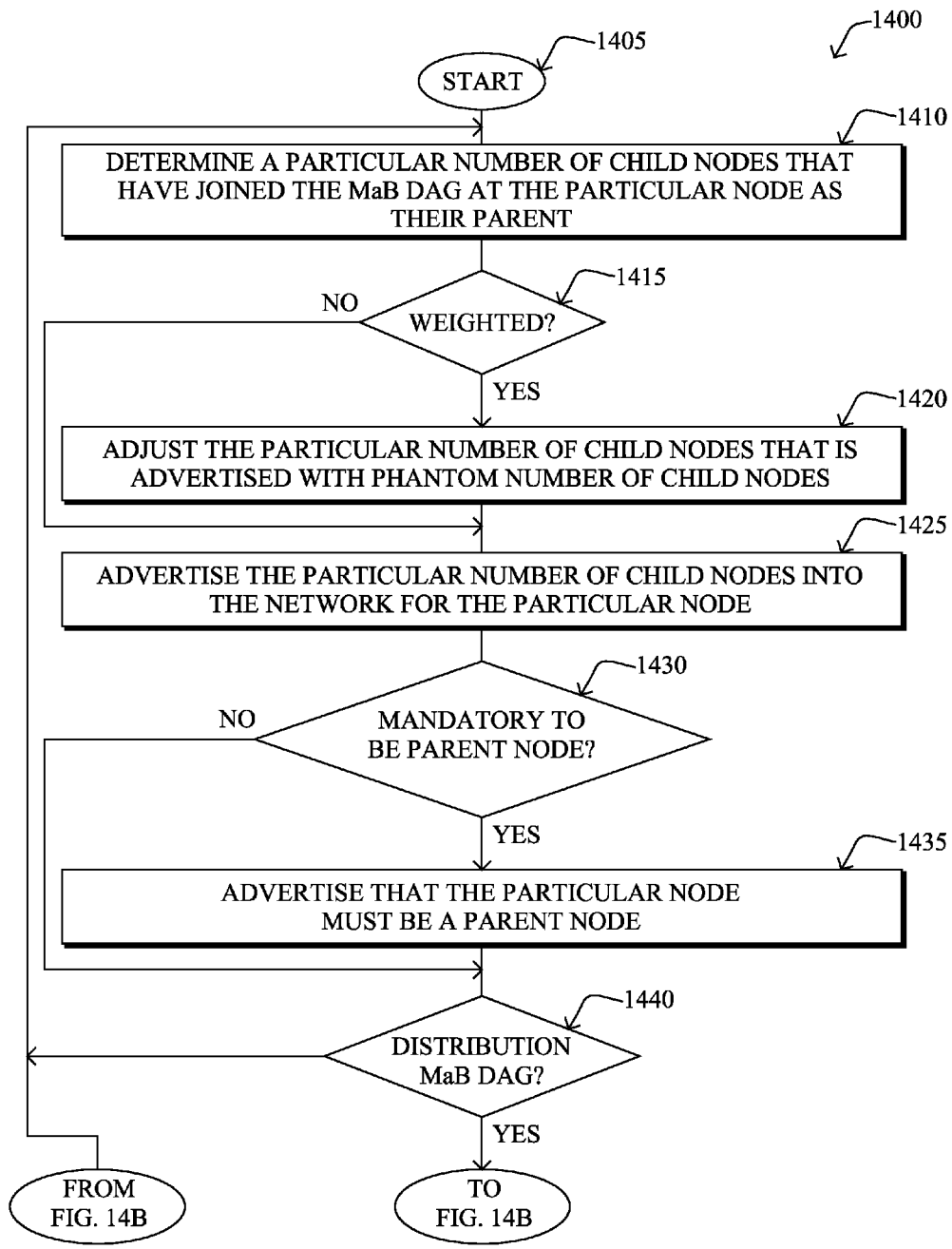
FIGS. 14A-B illustrate an example simplified procedure for gravitationally selecting MaB DAG parents, from the perspective of the parent nodes.
Figure 14B:
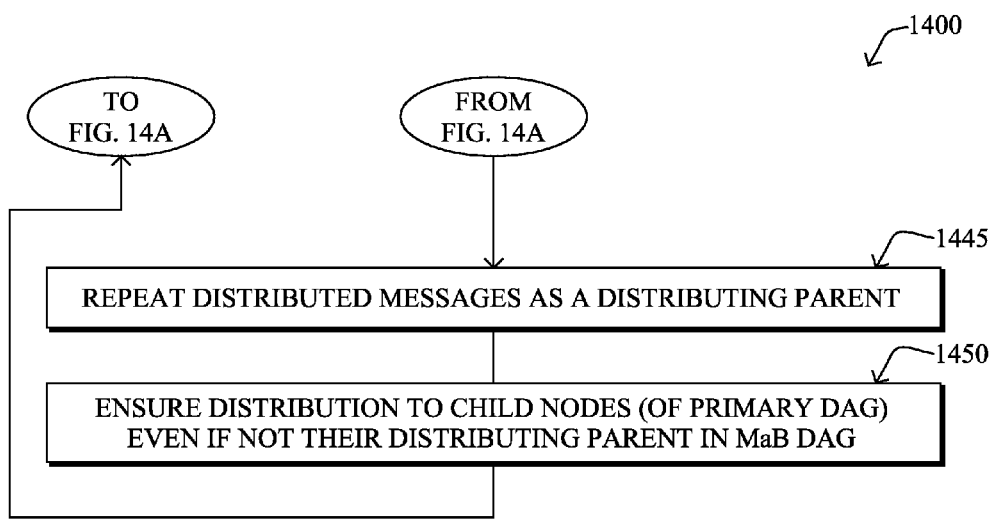

In addition, FIGS. 14A-B illustrate another example simplified procedure for gravitationally selecting MaB DAG parents in accordance with one or more embodiments described herein, e.g., from the perspective of the parent. The procedure 1400 starts at step 1405, and continues to step 1410, where a particular node in a DAG determines a particular number of child nodes that have joined the DAG at the particular node as their parent. It should be noted that the MaB DAG is illustratively initialized to be identical to the primary DAG which is used for routing unicast messages. As such, those skilled in the art will recognize that leaf nodes may be initialized as having zero children. If the particular node has a weighted adjustment value in step 1415, then in step 1420 the node adjusts the particular number of child nodes that is advertised with a phantom (positive or negative) number of child nodes. The number of child nodes may then be advertised in step 1425 into the network for the particular node. Note also that if the particular node is a mandatory parent node in step 1430, i.e., has received indication from one of its child nodes that the particular node is the only available parent for the child node, then in step 1435 this fact is also advertised.

If in step 1440 the node determines that its state is to operate as a distribution node on the MaB DAG, then in step 1445 (FIG. 14B) the MaB DAG parent node may repeat distributed messages (broadcast and/or multicast messages), accordingly. Notably, as nodes migrate away from a parent node (because it has low gravity—small number of children)

the nodes notify the parent that they no depend on it for receiving broadcast and multicast messages. As such, if a node has no children or loses all of its children, then the node enters into a state wherein it no longer repeats multicast or broadcast messages in step 1440, and the procedure returns to step 1410 to advertise the zero children.

If the MaB DAG parent node is also a parent node in the primary DAG then in step 1450 that parent node may be configured to ensure distribution of messages to its primary DAG child nodes (by repeating the messages), even if it not specifically told that a child "selected" them, as the MaB DAG 610 is initialized from the primary DAG 410 in certain embodiments, as described above.

The procedure 1400 recursively returns to step 1410 to determine updated numbers of child nodes based on the child node's adaptive operation as described above (e.g., in FIGS. 13A-B).

It should be noted that FIGS. 13A-14B are merely examples for illustration, and are not meant to be limiting to the scope of the embodiments herein. For instance, while certain steps within the procedures 1300 and 1400 may be optional as described above, certain steps may be included or excluded as desired, and the steps may also be in a different order where suitable.

The novel techniques described herein, therefore, provide for gravitational parent selection in a MaB DAG in a computer network. In particular, the techniques herein minimize the number of packets sent over the shared medium, and as such reduce packet collisions, which increases network efficiency. For instance, by having child nodes gravitate toward parent nodes with more children, those parent nodes become responsible for a larger number of nodes, potentially alleviating the need for other parent nodes (with fewer children) to act as a MaB DAG parent node. By limiting the number of parent nodes in the network, the techniques therefore prevent excessive traffic in the network from repeated messages that would be otherwise duplicated at a receiving child node. In other words, the techniques herein may be used to reduce the number of duplicate packets which need to be processed by the various nodes, thus reducing the wasted resources which are required for transmitting the messages by a first node, receiving the duplicate packets (at times hundreds of them) by a second node, comparing the IDs of the received packet with IDs of packets previously received, and discarding the duplicate packets once they have been identified as such. Additionally, by eliminating many of disruptive transmissions, the system greatly reduces the average power consumption of the nodes in the system which is especially important for low power battery operated nodes.

While there have been shown and described illustrative embodiments that provide for gravitational parent selection in a MaB DAG in a computer network, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not as limited, and may, in fact, be used with other types of networks and/or protocols utilizing DAG routing (e.g., distance vector protocols). Also, while the techniques described above generally reference wireless communication, other shared media (e.g., PLC) may be used.

Note also that while the embodiments described above have generally be described with relation to recursive phases, where all the nodes make a change, then all the nodes react to all of the previous changes. In practice, however, it is more likely that the process will be distributed and many steps will be executed in parallel by various nodes, such that one node may make a parent selection, and another node may hear about this selection (e.g., before making its own decision), and that other node may then base its decision on the completed selection. The description above is therefore not meant to limit the embodiments herein.

In addition, while the embodiments above are generally directed to using the MaB DAG for multicast and broadcast messages, traditional DAGs (for any type of message, e.g., unicast) may also utilize the techniques herein during their establishment and maintenance.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a particular node in a computer network, an indication of a number of child nodes of one or more potential parent nodes to the particular node in a multicast and broadcast (MaB) directed acyclic graph (DAG);
selecting a particular potential parent node with a highest number of child nodes from a plurality of nodes with children as a DAG parent for the particular node in the DAG;
joining the DAG by the particular node at the selected DAG parent;
determining a particular number of child nodes that have joined the DAG at the particular node as their parent; and
advertising the particular number of child nodes into the network for the particular node; and
adjusting the particular number of child nodes that is advertised with a phantom number of child nodes.

2. The method as in claim 1, wherein two or more of the potential parent nodes have a same highest number of child nodes, wherein selecting comprises:
selecting one of the two or more potential parent nodes having the same highest number as the DAG parent.

3. The method as in claim 1, further comprising:
determining that the particular node has only one available potential parent node and, in response, selecting the one available potential parent node as the DAG parent; and
notifying the DAG parent that it is the only available potential parent node of the particular node.

4. The method as in claim 1, further comprising:
utilizing the DAG for at least one of either multicast message distribution or broadcast message distribution.

5. The method as in claim 1, further comprising:
notifying a previous parent of the particular node in the DAG of the selected DAG parent.

6. The method as in claim 1, further comprising:
receiving a notification from the particular potential parent node that the particular potential parent node must be a parent node and, in response, selecting the particular potential parent node as the DAG parent.

7. The method as in claim 6, wherein two or more of the potential parent nodes must be a parent node, wherein selecting comprises:
   selecting one of the two or more potential parent nodes that must be a parent node as the DAG parent.

8. The method as in claim 1, further comprising: receiving a notification from a particular child node that the particular node must be a parent node to the particular child node and, in response, advertising that the particular node must be a parent node into the network.

9. The method as in claim 1, further comprising:
   repeating distributed messages only in response to the particular node having one or more child nodes in the DAG.

10. The method as in claim 1, further comprising:
    selecting a plurality of DAG parents; and
    joining the DAG by the particular node at the plurality of selected DAG parents.

11. An apparatus, comprising:
    one or more network interfaces to communicate in a multicast and broadcast (MaB) directed acyclic graph (DAG) in a computer network as a particular node;
    a processor coupled to the one or more network interfaces and adapted to execute one or more processes; and
    a memory configured to store a process of the one or more processes executable by the processor, the process when executed operable to:
        receive an indication of a number of child nodes of one or more potential parent nodes to the particular node in the DAG;
        select a particular potential parent node with a highest number of child nodes from a plurality of nodes with children as a DAG parent for the particular node in the DAG; and
        join the DAG by the particular node at the selected DAG parent;
        determine a particular number of child nodes that have joined the DAG at the particular node as their parent;
        advertise the particular number of child nodes into the network for the particular node; and
        adjust the particular number of child nodes that is advertised with a phantom number of child nodes.

12. The apparatus as in claim 11, wherein two or more of the potential parent nodes have a same highest number of child nodes, wherein the process when executed is further operable to select one of the two or more potential parent nodes having the same highest number as the DAG parent.

13. The apparatus as in claim 11, wherein the process when executed is further operable to:
    receive a notification from the particular potential parent node that the particular potential parent node must be a parent node; and, in response, select the particular potential parent node as the DAG parent.

14. The apparatus as in claim 11, wherein the process when executed is further operable to utilize the DAG for at least one of either multicast message distribution or broadcast message distribution.

15. The apparatus as in claim 11, wherein the process when executed is further operable to notify a previous parent of the particular node in the DAG of the selected DAG parent.

16. A tangible, non-transitory, computer-readable media having software encoded thereon, the software when executed by a processor on a particular node in a multicast and broadcast (MaB) directed acyclic graph (DAG) operable to:
    receive an indication of a number of child nodes of one or more potential parent nodes to the particular node in the MaB DAG;
    select a particular potential parent node with a highest number of child nodes from a plurality of nodes with children as a multicast and broadcast (MaB)-DAG parent for the particular node;
    join the DAG by the particular node at the selected DAG parent;
    determine a particular number of child nodes that have joined the DAG at the particular node as their parent;
    advertise the particular number of child nodes into the network for the particular node; and
    adjust the particular number of child nodes that is advertised with a phantom number of child nodes.

17. The tangible, non-transitory, computer-readable media as in claim 16, wherein two or more of the potential parent nodes have a same highest number of child nodes, wherein the process when executed is further operable to select one of the two or more potential parent nodes having the same highest number as the DAG parent.

18. The tangible, non-transitory, computer-readable media as in claim 16, wherein the software when executed is further operable to:
    receive a notification from the particular potential parent node that the particular potential parent node must be a parent node; and, in response, select the particular potential parent node as the DAG parent.

19. The tangible, non-transitory, computer-readable media as in claim 16, wherein the software when executed is further operable to utilize the DAG for at least one of either multicast message distribution or broadcast message distribution.

20. The tangible, non-transitory, computer-readable media as in claim 16, wherein the software when executed is further operable to notify a previous parent of the particular node in the DAG of the selected DAG parent.

* * * * *